(12) United States Patent
Atti et al.

(10) Patent No.: US 10,074,373 B2
(45) Date of Patent: Sep. 11, 2018

(54) CHANNEL ADJUSTMENT FOR INTER-FRAME TEMPORAL SHIFT VARIATIONS

(71) Applicant: QUALCOMM Incorporated, San Diego, CA (US)

(72) Inventors: Venkatraman Atti, San Diego, CA (US); Venkata Subrahmanyam Chandra Sekhar Chebiyyam, San Diego, CA (US); Daniel Jared Sinder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/372,833

(22) Filed: Dec. 8, 2016

(65) Prior Publication Data

US 2017/0178639 A1 Jun. 22, 2017

Related U.S. Application Data

(60) Provisional application No. 62/270,501, filed on Dec. 21, 2015.

(51) Int. Cl.
| | |
|---|---|
| *G10L 19/00* | (2013.01) |
| *G10L 19/008* | (2013.01) |
| *G10L 19/025* | (2013.01) |
| *G10L 19/16* | (2013.01) |
| *H04W 88/02* | (2009.01) |
| *H04W 88/08* | (2009.01) |

(52) U.S. Cl.
CPC .......... *G10L 19/008* (2013.01); *G10L 19/025* (2013.01); *G10L 19/167* (2013.01); *H04W 88/02* (2013.01); *H04W 88/08* (2013.01)

(58) Field of Classification Search
CPC .................................................... G10L 19/008
USPC ......................................................... 704/503
See application file for complete search history.

(56) References Cited

U.S. PATENT DOCUMENTS

| | | | |
|---|---|---|---|
| 6,973,184 B1 | 12/2005 | Shaffer et al. | |
| 2007/0191976 A1* | 8/2007 | Ruokangas | .............. G10H 1/02 |
| | | | 700/94 |
| 2009/0276210 A1 | 11/2009 | Goto et al. | |

(Continued)

OTHER PUBLICATIONS

Partial International Search Report—PCT/US2016/065860—ISA/EPO—dated Feb. 20, 2017.

(Continued)

*Primary Examiner* — Shaun A Roberts
(74) *Attorney, Agent, or Firm* — Qualcomm Incorporated-Toler

(57) ABSTRACT

A method of wireless communication includes receiving, at a first device, a reference channel and a target channel. The reference channel includes a set of reference samples, and target channel includes a set of target samples. The method also includes determining a variation between a first mismatch value and a second mismatch value. The method also includes adjusting the set of target samples based on the variation to generate an adjusted set of target samples. The method further includes generating at least one encoded channel based on the set of reference samples and the adjusted set of target samples. The method also includes transmitting the at least one encoded channel to a second device.

61 Claims, 11 Drawing Sheets

(56) References Cited

U.S. PATENT DOCUMENTS

| | | | |
|---|---|---|---|
| 2011/0054885 A1* | 3/2011 | Nagel | G10L 21/038 |
| | | | 704/203 |
| 2011/0087487 A1* | 4/2011 | Neuman | G11B 20/00007 |
| | | | 704/201 |
| 2011/0191111 A1* | 8/2011 | Chu | G10L 19/005 |
| | | | 704/500 |
| 2011/0288872 A1 | 11/2011 | Liu et al. | |
| 2011/0293111 A1* | 12/2011 | Chang | H04R 3/005 |
| | | | 381/97 |
| 2011/0301962 A1 | 12/2011 | Wu et al. | |
| 2012/0053714 A1 | 3/2012 | Wu et al. | |
| 2012/0134511 A1* | 5/2012 | Vilermo | G10L 19/008 |
| | | | 381/107 |
| 2013/0282384 A1 | 10/2013 | Gibbs | |

OTHER PUBLICATIONS

International Search Report and Written Opinion—PCT/US2016/065860—ISA/EPO—dated Apr. 10, 2017.

* cited by examiner

CHANNEL ADJUSTMENT FOR INTER-FRAME TEMPORAL SHIFT VARIATIONS

I. CLAIM OF PRIORITY

The present application claims priority from U.S. Provisional Patent Application No. 62/270,501 entitled "AUDIO SIGNAL ADJUSTMENT FOR INTER-FRAME TEMPORAL SHIFT VARIATIONS," filed Dec. 21, 2015, the contents of which are incorporated by reference herein in their entirety.

II. FIELD

The present disclosure is generally related to channel adjustment for inter-frame temporal shift variations.

III. DESCRIPTION OF RELATED ART

Advances in technology have resulted in smaller and more powerful computing devices. For example, a variety of portable personal computing devices, including wireless telephones such as mobile and smart phones, tablets and laptop computers are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing and networking capabilities.

Electronic devices, such as wireless telephones, may include multiple microphones to receive audio signals. In many situations, a sound source (e.g., a person speaking, a music source, etc.) may be closer to a first microphone than to a second microphone. In such situations, a second audio signal received from the second microphone may be delayed relative to a first audio signal received from the first microphone. One form of encoding used to encode audio signals is stereo encoding. In stereo encoding, audio signals from the microphones may be encoded to generate a mid-channel (e.g., a signal that corresponds to a sum of the first audio signal and the second audio signal) and a side-channel (e.g., a signal that corresponds to a difference between the first audio signal and the second audio signal). Because of the delay between reception of the first audio signal and the second audio signal, the audio signals may be temporally misaligned, which may increase the difference between the first audio signal and the second audio signal. Because of the increase in the difference between the first audio signal and the second audio signal, a greater number of bits may be used to encode the side-channel.

To reduce the difference between the first audio signal and the second audio signal (and to reduce the number of bits used to encode the side-channel), the first audio signal and the second audio signal may be temporally aligned. For example, a frame of the second audio signal may be time-shifted to temporally align the frame of the second audio signal with a corresponding frame of the first audio signal. Because the distance between the sound source and the microphones may change, a shift amount (e.g., an amount of samples that the second audio signal is shifted) may change from frame to frame. If the shift values between two frames are different, a discontinuity may be introduced at the boundary between the two frames. For example, due to the difference in shift values, one or more samples may be skipped or repeated from one frame to the next. Discontinuities at frame boundaries of the audio signals may result in audible clicks or other audio artifacts during playback of the audio signals.

IV. Summary

According to one implementation, a device includes an encoder configured to receive a reference channel and a target channel. The reference channel includes a set of reference samples, and the target channel includes a set of target samples. The encoder is also configured to determine a variation between a first mismatch value and a second mismatch value. The first mismatch value is indicative of an amount of temporal mismatch between a first reference sample of the set of reference samples and a first target sample of the set of target samples. The second mismatch value is indicative of an amount of temporal mismatch between a second reference sample of the set of reference samples and a second target sample of the set of target samples. The encoder is configured to adjust the set of target samples based on the variation to generate an adjusted set of target samples. The encoder is configured to generate at least one encoded channel based on the set of reference samples and the adjusted set of target samples. The device includes a network interface configured to transmit the at least one encoded channel.

According to another implementation, a method of wireless communication includes receiving, at a first device, a reference channel and a target channel. The reference channel includes a set of reference samples, and the target channel includes a set of target samples. The method also includes determining a variation between a first mismatch value and a second mismatch value. The first mismatch value is indicative of an amount of temporal mismatch between a first reference sample of the set of reference samples and a first target sample of the set of target samples. The second mismatch value is indicative of an amount of temporal mismatch between a second reference sample of the set of reference samples and a second target sample of the set of target samples. The method also includes adjusting the set of target samples based on the variation to generate an adjusted set of target samples. The method further includes generating at least one encoded channel based on the set of reference samples and the adjusted set of target samples. The method also includes transmitting the at least one encoded channel to a second device.

According to another implementation, an apparatus includes means for receiving a reference channel and means for receiving a target channel. The reference channel includes a set of reference samples, and the target channel includes a set of target samples. The apparatus also includes means for determining a variation between a first mismatch value and a second mismatch value. The first mismatch value is indicative of an amount of temporal mismatch between a first reference sample of the set of reference samples and a first target sample of the set of target samples. The second mismatch value is indicative of an amount of temporal mismatch between a second reference sample of the set of reference samples and a second target sample of the set of target samples. The apparatus also includes means for adjusting the set of target samples based on the variation to generate an adjusted set of target samples. The apparatus further includes means for generating at least one encoded channel based on the set of reference samples and the adjusted set of target samples. The apparatus also includes means for transmitting the at least one encoded channel.

According to another implementation, a non-transitory computer-readable medium stores instructions that, when executed by a processor, cause the processor to perform operations including receiving, at a first device, a reference channel and a target channel. The reference channel includes a set of reference samples, and the target channel includes a set of target samples. The operations also include determining a variation between a first mismatch value and a second mismatch value. The first mismatch value is indicative of an amount of temporal mismatch between a first reference sample of the set of reference samples and a first target sample of the set of target samples. The second mismatch value is indicative of an amount of temporal mismatch between a second reference sample of the set of reference samples and a second target sample of the set of target samples. The operations also include adjusting the set of target samples based on the variation to generate an adjusted set of target samples. The operations further include generating at least one encoded channel based on the set of reference samples and the adjusted set of target samples. The operations also include transmitting the at least one encoded channel to a second device.

Other implementations, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
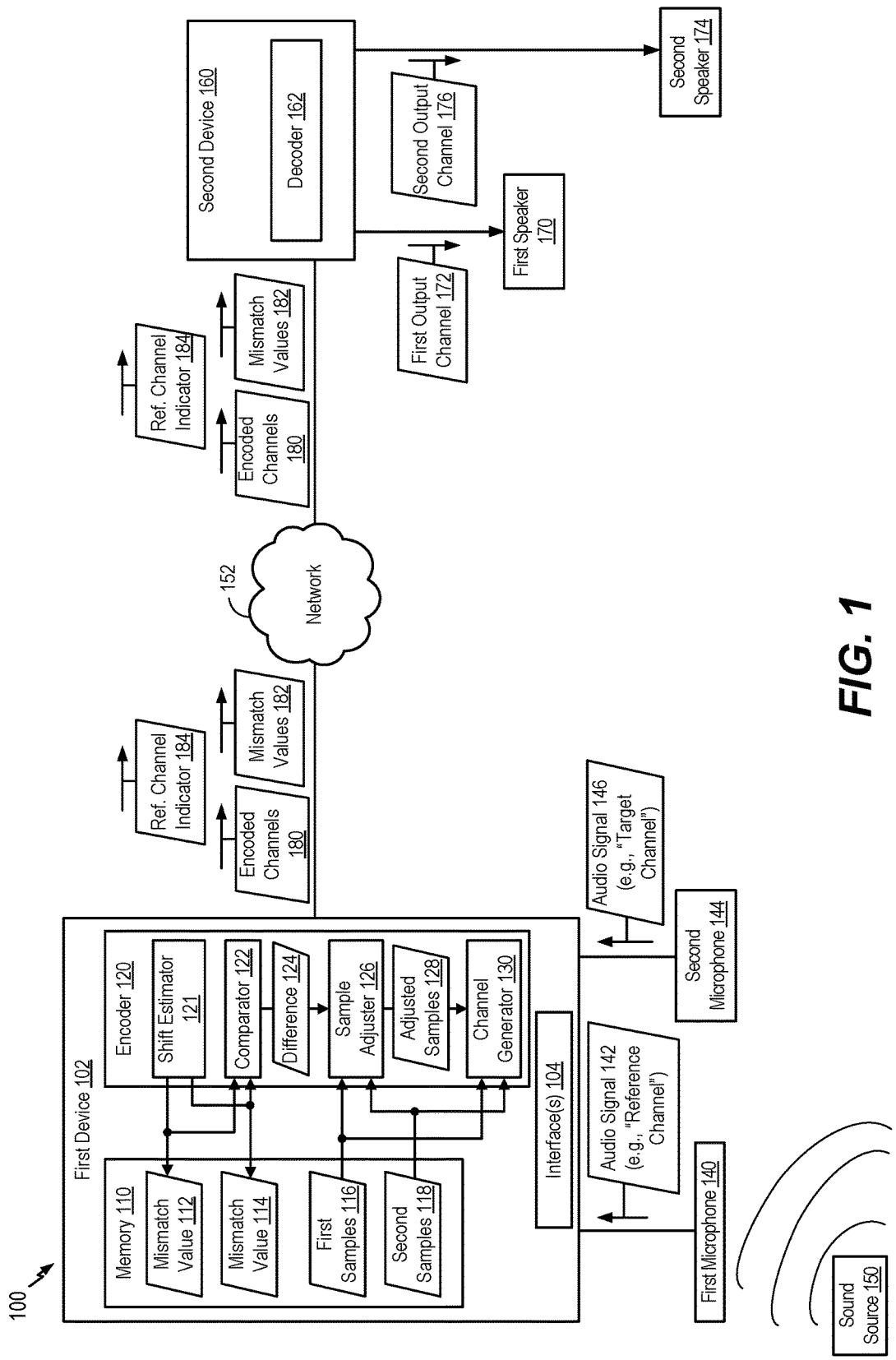
FIG. 1 is a block diagram of a particular implementation of a system that includes a device configured to adjust audio samples based on a variation between mismatch values.

Particular aspects of the present disclosure are described below with reference to the drawings. In the description, common features are designated by common reference numbers throughout the drawings. As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element.

Systems and methods of adjusting samples of audio channels used in multichannel audio encoding are disclosed. A device may include an encoder that is configured to encode multiple audio channels. The multiple audio channels may be captured concurrently in time using multiple audio capture devices (e.g., multiple microphones). The device may be configured to time-shift one of the multiple audio channels to account for delay in receipt of the audio channel via one of the multiple microphones. To illustrate, multiple microphones may be deployed at multiple locations in a teleconference room, and a sound source (e.g., a person speaking) may be closer to a first microphone than to a second microphone. Accordingly, a second audio channel received via the second microphone may be delayed relative to a first audio channel received via the first microphone.

Delay in receipt one or more of the audio channels may decrease coding efficiency. To illustrate, in stereo encoding, audio channels from the multiple microphones may be encoded to generate a mid-channel and a side-channel. The mid-channel may correspond to a sum of the first audio channel and the second audio channel, and the side-channel may correspond to a difference between the first audio channel and the second audio channel. If the difference between the first audio channel and the second audio channel is small, most of the bits of the stereo encoding may be used for encoding the mid-channel, which increases coding efficiency of the mid-channel and increases quality of playback of the audio channels after decoding. If the first audio channel and the second audio channel are not temporally aligned (e.g., if one audio channel is temporally delayed relative to the other audio channel), the difference between the first audio channel and the second audio channel may increase, and thus the number of bits used to encode the side-channel may increase. Increasing the number of bits used to encode the side-channel decreases the number of bits available to encode the mid-channel.

To reduce the difference between the first audio channel and the second audio channel, one of the audio channels may be time-shifted to temporally align the audio channels. The encoder may be configured to determine a first mismatch value indicative of a first shift of the first audio channel relative to the second audio channel. For example, the first mismatch value may indicate a number of samples that a frame of the second audio channel is shifted to temporally align the frame of the second audio channel with a corresponding frame of the first audio channel. The encoder may time-shift a second frame of the second audio channel based on the first mismatch value to temporally align the second frame with a first frame of the first audio channel. Temporally aligning the first audio channel and the second audio channel may reduce a difference between the first audio channel and the second audio channel. Because the delay of one audio channel relative to another audio channel may vary from frame to frame, the encoder may be configured to determine a corresponding mismatch value for each frame of the audio channels. For example, the encoder may be configured to determine a second mismatch value indicative of a second shift of the first audio channel relative to the second audio channel, and the encoder may be configured to time-shift a fourth frame of the second audio channel based on the second mismatch value to temporally align the fourth frame with a third frame of the first audio channel. If the first mismatch value and the second mismatch value are different, the difference between the first mismatch value and the second mismatch value may cause a discontinuity at a boundary between the second frame and the fourth frame of the second audio channel. The discontinuity may cause an audible click or other audio artifact during playback of decoded audio channels.

To compensate for inter-frame variation in time-shifting (e.g., different mismatch values for different frames), the encoder may be configured to adjust the second audio channel based on the difference between the first mismatch value and the second mismatch value. Adjusting the second audio channel may reduce (or eliminate) discontinuities at frame boundaries. In a particular example, each frame includes 640 samples, the first mismatch value is two samples, and the second mismatch value is three samples. In this example, to temporally align the audio channels, samples 0-639 (representing the first frame) of the first audio channel are temporally aligned with samples 2-641 (representing the second frame) of the second audio channel, and samples 640-1279 (representing the third frame) of the first audio channel are temporally aligned with samples 643-1282 (representing the fourth frame) of the second audio channel. The temporal alignment of the second audio channel with the first audio channel may cause sample 642 to be skipped, which causes a discontinuity between the second frame and the fourth frame and may cause a click or other sound during playback of the audio channels.

To compensate for the discontinuity, the encoder may be configured to adjust the second audio channel to reduce the difference in samples between frames. Adjusting the second audio channel based on the difference may be referred to as "smoothing" or "slow shifting" the second audio channel. To illustrate, the encoder may be configured to interpolate a portion of the samples of the second audio channel based on the difference to "spread out" the discontinuity over multiple samples. The interpolation may include a sinc interpolation, a Lagrange interpolation, a hybrid interpolation (e.g., a combination of sinc interpolation and Lagrange interpolation), or another type of interpolation. As a particular illustrative example, a discontinuity may be spread out over a subset of samples (e.g., samples 642, 643, 644, 645, and 646) by estimating samples 642.x, 643.y, 644.z, and 646 using interpolation, where x, y, and z are values based on a fractional sample resolution. The sample resolution may be uniformly spaced or non-uniformly spaced. In implementations having a uniformly spaced sample resolution, the interpolation may be based on the expression D/N_SPREAD, where D is the difference (in number of samples) between the first mismatch value and the second mismatch value, and N_SPREAD is the number of samples over which the discontinuity is spread out. In a particular implementation, N_SPREAD may be any value that is less than a total number of samples included in a frame (N). Alternatively, N_SPREAD may be equal to N, or N_SPREAD may be greater than N (e.g., the discontinuity may be spread out over multiple frames). The larger the value of N_SPREAD, the "smoother" the shift (e.g., the smaller the difference between each estimated sample).

As a particular example of sample resolution having uniform spacing, D is one (e.g., the second mismatch value—the first mismatch value is one), N_SPREAD is four, and the encoder may interpolate the second audio channel based on a one-sample difference to generate four estimated samples. In this example, the sample resolution is 0.25, the four estimated samples may represent samples 642.25, 643.5, 644.75, and 646, and the encoder may replace four samples of the second audio channel (e.g., samples 643-646) with the four estimated samples. The difference between each the last sample of the second frame (e.g., sample 641) and each estimated sample is less than a difference between sample 641 and 643 (e.g., due to sample 642 being skipped), and thus a difference between any two samples is reduced as compared to skipping one or more samples. Alternatively, the sample resolution may be non-uniformly spaced. As a particular example of sample resolution having non-uniform spacing, estimates for samples 642.25, 643, 644.5, and 646 may be estimated using interpolation. Alternatively, the sample resolution may be non-uniformly spaced and may be a progressively increasing resolution or a progressively decreasing resolution. Reducing the temporal difference between samples (e.g., spreading the one-sample temporal difference over several samples of the second audio channel using the estimated samples), smooths (e.g., reduces) or compensates for the discontinuity at the frame boundary.

After adjusting the second channel, the encoder may generate at least one encoded channel based on the first audio channel and the adjusted second audio channel. For example, the encoder may generate a mid-channel and a side-channel based on the first audio channel and the adjusted second audio channel. The at least one encoded channel may be transmitted to a second device. The second device may include a decoder that is configured to decode the at least one encoded channel. Because the second audio channel is adjusted prior to generation of the at least one encoded channel, during playback of the decoded audio channels, clicks or other sounds due to discontinuities between frames may be reduced (or eliminated).

Referring to FIG. 1, a particular illustrative example of a system that includes a device configured to adjust audio samples based on a difference between mismatch values is shown and generally designated 100. The system 100 includes a first device 102 and a second device 160. The first device 102 may be communicatively coupled to the second device 160 via a network 152. The network 152 may include a voice over internet protocol (VoIP) network, a voice over long-term evolution (VoLTE) network, another packet-switched network, a public switched telephone network (PSTN) network, a Global System for Mobile Communications (GSM) network, another circuit-switched network, the Internet, a wireless network, an Institute of Electronics and Electrical Engineers (IEEE) 802.11 network, a satellite network, a wired network, or another network. In a particular implementation, the first device 102, the second device 160, or both may include a communication device, a headset, a decoder, a smart phone, a cellular phone, a mobile communication device, a laptop computer, a computer, a tablet, a personal digital assistant (PDA), a set top box, a video player, an entertainment unit, a display device, a television, a gaming console, a music player, a radio, a digital video player, a digital video disc (DVD) player, a tuner, a camera, a navigation device, a vehicle, an on-board component of a vehicle, or a combination thereof. Although the first device 102 is described herein as transmitting data (e.g., channels, values, indicators, etc.) and the second device 160 is described as receiving data, in other implementations the first device 102 may receive data from the second device 160. Accordingly, the illustration of FIG. 1 is not limiting.

The first device 102 may include an encoder 120, a memory 110, and one or more interfaces 104. The first device 102 may also include a processor (e.g., a central processing unit (CPU), a digital signal processor (DSP), etc.), which is not illustrated for convenience. In a particular implementation, the encoder 120 may be included or integrated in an enhanced voice services (EVS) CODEC that communicates in accordance with one or more standards or protocols, such as a 3rd Generation Partnership Project (3GPP) EVS protocol.

The one or more interfaces 104 may include network interfaces, such as wireless interfaces (e.g., IEEE 802.11 interfaces, satellite interfaces, near-field communication interfaces, etc.), wired interfaces, input/output (I/O) interfaces, peripheral interfaces, and other interfaces. A first input interface of the one or more interfaces 104 may be coupled to a first microphone 140, a second input interface of the one or more interfaces 104 may be coupled to a second microphone 144, and a network interface of the one or more interfaces 104 may be communicatively coupled to the second device 160 via the network 152. The first input interface of the one or more interfaces 104 may be configured to receive a first audio signal 142 from the first microphone 140, and the second input interface of the one or more interfaces 104 may be configured to receive a second audio signal 146 from the second microphone 144. In the example of FIG. 1, the first audio signal 142 is a "reference channel" and the second audio signal 146 is a "target channel". For example, the second audio signal 146 may be adjusted (e.g., temporally shifted) to temporally align with the first audio signal. However, as described below, in other implementations, the first audio signal 142 may be the target channel and the second audio signal 146 may be the reference channel. As used herein, "signal" and "channel" may be used interchangeably. In other implementations, the first device 102 may include more than two interfaces that are communicatively coupled to more than two microphones. In a particular implementation, the first audio signal 142 includes one of a right channel signal or a left channel signal, and the second audio signal 146 includes the other of the right channel signal or the left channel signal. In other implementations, the audio signals 142 and 146 include other audio signals.

The network interface of the one or more interfaces 104 may be configured to transmit data, such as encoded audio channels and related information, to the second device 160 via the network 152. In some implementations, the one or more interfaces 104 may include a transceiver, a receiver, or both (or a transceiver), that are configured to send and to receive data via the network 152. The encoder 120 may be configured to process and encode audio channels, as further described herein. Alternatively, the memory 110 may store instructions executable by the encoder 120 (or a processor) to perform the operations described herein.

The memory 110 may store mismatch values, such as a first mismatch value 112 and a second mismatch value 114, and audio samples, such as first samples 116 and second samples 118. The first audio signal 142 may be associated with the first samples 116 (e.g., the first audio signal 142 may be sampled to generate the first samples 116), and the second audio signal 146 may be associated with the second samples 118 (e.g., the second audio signal 146 may be sampled to generate the second samples 118). The mismatch values 112 and 114 may indicate shifts between the first samples 116 and the second samples 118 (e.g., between the first audio signal 142 and the second audio signal 146) that are used to temporally align the first samples 116 and the second samples 118, as further described herein. In some implementations, the memory 110 may store additional data, such as data indicative of indicators, gain parameters, and other information related to the encoding and transmission of audio channels.

The encoder 120 may be configured to down-mix and encode multiple audio channels. As part of processing and encoding the multiple audio channels, the encoder 120 may be configured to temporally align an audio channel with respect to another audio channel. For example, the encoder 120 may be configured to temporally align frames of the reference channel 142 with frames of the target channel 146 by manipulating the first samples 116 and the second samples 118 prior to encoding. Temporally aligning audio channels may reduce the number of bits used to encode a side-channel (or parameters) based on the audio channels and may thereby increase the number of bits used to encode a mid-channel based on the audio channels. Using more bits to encode the mid-channel may increase coding efficiency of the mid-channel and may increase quality of playback of decoded audio channels at the second device 160.

To temporally align the first audio signal 142 and the second audio signal 146, the encoder 120 may be configured to determine the first mismatch value 112 and the second mismatch value 114. For example, the encoder 120 may include a shift estimator 121 configured to determine the first mismatch value 112 and the second mismatch value 114. The first mismatch value 112 may be indicative of a shift of a first frame of the first audio signal 142 relative to a second frame of the second audio signal 146, and the second mismatch value 114 may be indicative of a shift of a third frame of the first audio signal 142 to a fourth frame of the second audio signal 146. The third frame may be subsequent to the first frame, and the fourth frame may be subsequent to the second frame. The mismatch values 112 and 114 may indicate a number of samples (or an amount of time (in milliseconds)) that the second audio signal 146 (e.g., a "reference" signal) is to be time-shifted to temporally align the second audio signal 146 with the first audio signal 142 (e.g., a "target" signal). As an illustrative example, a particular frame of the target channel is delayed relative to a corresponding frame of the reference channel by a time period that corresponds to two samples (e.g., based on a sampling rate) of the target channel, a corresponding mismatch value has a value of two. A target channel may refer to a signal that is time-shifted relative to a reference channel (e.g., a signal that is not time-shifted). A target channel that is time shifted or adjusted (e.g., an "adjusted target channel") differs from a coded target channel, which refers to a signal used to generate a coded signal (e.g., a mid channel signal, a side channel signal, etc., as further described herein). As further described herein, the encoder 120 may determine which of the first audio signal 142 and the second audio signal 146 is the target channel (or the reference channel) for each frame. The determination of which signal is the target channel and which signal is the reference channel may be made on a per-frame basis. For example, the encoder 120 may determine that the first audio signal 142 is the reference channel and that the second audio signal 146 is the target channel for a first pair of frames (e.g., a first frame corresponding to the first audio signal 142 and the second audio signal 146), and the encoder 120 may determine that the first audio signal 142 is the target channel and that the second audio signal 146 is the reference channel for a second pair of frames (e.g., a third frame corresponding to the first audio signal 142 and a fourth frame corresponding to the second audio signal 146).

The first audio signal 142 and the second audio signal 146 may be temporally unaligned due to locations of the first microphone 140, the second microphone 144, and a sound source 150. For example, the sound source 150 may be a person speaking in a teleconference room, and at a particular time, the person (e.g., the sound source 150) may be closer to the first microphone 140 than to the second microphone 144. In other examples, the sound source 150 may be an ambient noise, a musical instrument, a music source, or another source of sound. Because the sound source 150 is farther away from the second microphone 144, the second audio signal 146 may be received with a delay relative to the first audio signal 142.

A difference between the first audio signal 142 and the second audio signal 146 may be larger when one audio channel is delayed as compared to when the first audio signal 142 and the second audio signal 146 are temporally aligned. A large difference may decrease coding efficiency at the encoder 120. To illustrate, the encoder 120 may be configured to generate at least one encoded channel, such as encoded channels 180, based on the first audio signal 142 and the second audio signal 146. For example, the encoder 120 may include a channel generator 130 configured to generate the encoded channels 180. In a particular implementation, the channel generator 130 may be configured to perform stereo encoding to generate a mid-channel (e.g., a channel representing a sum of the first audio signal 142 and the second audio signal 146) and a side-channel (e.g., a channel representing a difference between the first audio signal 142 and the second audio signal 146). The encoded channels 180 may include the mid-channel, the side-channel, or both.

The channel generator 130 may generate the mid-channel and the side-channel according to the following Equations:

$$M = \text{Ref}(n) + \text{Targ}(n+N_1), \quad \text{Equation 1a}$$

$$M = \text{Ref}(n) + g_D \text{Targ}(n+N_1), \quad \text{Equation 1b}$$

$$S = \text{Ref}(n) - g_D \text{Targ}(n+N_1), \quad \text{Equation 2a}$$

$$S = g_D \text{Ref}(n) - \text{Targ}(n+N_1), \quad \text{Equation 2b}$$

where M corresponds to the mid-channel, S corresponds to the side-channel, $g_D$ corresponds to a relative gain parameter (e.g., a parameter to normalize (or equalize) the power levels of the reference channel and the target channel, Ref(n) correspond to samples of the reference channel, Targ(n+$N_1$) corresponds to samples of the target channel, and $N_1$ corresponds to a non-causal mismatch value (based on the first mismatch value 112) of the second frame. As an example, the gain parameter may be based on one of the following Equations:

$$g_D = \frac{\sum_{n=0}^{N-N1} \text{Ref}(n)\,\text{Targ}(n+N_1)}{\sum_{n=0}^{N-N1} \text{Targ}^2(n+N_1)}, \quad \text{Equation 3a}$$

$$g_D = \frac{\sum_{n=0}^{N-N1} |\text{Ref}(n)|}{\sum_{n=0}^{N-N1} |\text{Targ}(n+N_1)|}, \quad \text{Equation 3b}$$

$$g_D = \frac{\sum_{n=0}^{N} \text{Ref}(n)\,\text{Targ}(n)}{\sum_{n=0}^{N} \text{Targ}^2(n)}, \quad \text{Equation 3c}$$

$$g_D = \frac{\sum_{n=0}^{N} |\text{Ref}(n)|}{\sum_{n=0}^{N} |\text{Targ}(n)|}, \quad \text{Equation 3d}$$

$$g_D = \frac{\sum_{n=0}^{N-N1} \text{Ref}(n)\,\text{Targ}(n)}{\sum_{n=0}^{N} \text{Ref}^2(n)}, \quad \text{Equation 3e}$$

$$g_D = \frac{\sum_{n=0}^{N-N1} |\text{Targ}(n)|}{\sum_{n=0}^{N} |\text{Ref}(n)|}, \quad \text{Equation 3f}$$

Alternatively, the channel generator 130 may generate the mid-channel and one or more side channel parameters based on the difference between the first audio signal 142 and the second audio signal 146. In other implementations, the channel generator 130 may be configured to perform other encoding, such as parametric stereo encoding, dual-mono encoding, or other encoding.

In implementations where the encoded channels 180 include the mid-channel and the side-channel, a total number of bits used for the encoded channels is divided between encoding of the mid-channel and encoding of the side-channel. If the difference between the first audio signal 142 and the second audio signal 146 is small, a few bits of are used for the encoding of the side-channel, and most bits are used for encoding the mid-channel. Using more bits to encode the mid-channel increases coding efficiency and may increase quality of decoded audio channels that are output at the second device 160. When the difference between the first audio signal 142 and the second audio signal 146 is large, more bits are used for encoding the side channel signal, which reduces the number of bits available for encoding the mid channel signal. Thus, the encoder 120 (e.g., the shift estimator 121) may be configured to temporally align the first audio signal 142 and the second audio signal 146 to reduce the difference between the first audio signal 142 and the second audio signal 146, thereby increasing a number of bits available for encoding the mid-channel.

To temporally align the first audio signal 142 and the second audio signal 146, the encoder 120 (e.g., the shift estimator 121) may be configured to determine mismatch values (e.g., the first mismatch value 112 and the second mismatch value 114) for each pair of frames of the first audio signal 142 and the second audio signal 146. The first mismatch value 112 may correspond to an amount of time delay between receipt of the first frame of the first audio signal 142 via the first microphone 140 and receipt of the second frame of the second audio signal 146 via the second microphone 144, and the second mismatch value 114 may correspond to an amount of time delay between receipt of the third frame of the first audio signal 142 via the first microphone 140 and receipt of the fourth frame of the second audio signal 146 via the second microphone 144.

The first mismatch value 112 and the second mismatch value 114 may be determined based on comparisons of a first down-sampled channel to a second down-sampled channel. The first down-sampled channel may be based on the first audio signal 142 and the second down-sampled channel may be based on the second audio signal 146. To illustrate, the shift estimator 121 may be configured to down-sample the reference channel 142 to generate a first down-sampled channel and to down-sample the target channel 146 to generate a second down-sampled channel. In other implementations, the down-sampled channels may be other resampled channels, such as up-sampled channels.

The shift estimator 121 may be configured to determine the first mismatch value 112 and the second mismatch value 114 based on comparisons of the first down-sampled channel and the second down-sampled channel. For example, the shift estimator 121 may generate comparison values, such as difference values, similarity values, coherence values, or cross-correlation values, based on comparisons of the first samples 116 and the second samples 118. The shift estimator 121 may identify a particular comparison value that has a higher (or lower) value than other comparison values, and the shift estimator 121 may identify a mismatch value (e.g., a "tentative" mismatch value) that corresponds to the particular comparison value. For example, the shift estimator 121 may compare a sample (or multiple samples) of the first down-sampled channel to samples of the second down-sampled channel to generate comparison values, and the shift estimator 121 may identify a particular sample of the second down-sampled channel that corresponds to the lowest (or highest) comparison value. The shift estimator 121 may generate the tentative mismatch value based on a delay of the particular sample of the second down-sampled channel to the sample of the first down-sampled channel.

The shift estimator 121 may generate one or more interpolated comparison values and an interpolated mismatch value based on the tentative mismatch value. The shift estimator 121 may "refine" the interpolated mismatch value to generate a mismatch value. For example, if a difference between the interpolated mismatch value and a mismatch value associated with a previous frame exceeds a threshold, the shift estimator 121 may select a threshold value (e.g., a "maximum" mismatch value) as the mismatch value, and if the difference fails to exceed a threshold, the shift estimator 121 may select the interpolated mismatch value as the mismatch value. The threshold may be selected to set a threshold discontinuity level that may occur from frame to frame. For example, the threshold may be set to four samples such that the discontinuity is no larger than four samples. Setting the threshold to a small value may reduce (or prevent) clicks or other audible sounds caused by discontinuities to be output during playback of decoded audio channels. In other implementations, the threshold may be higher, and the target channel may be adjusted (e.g., smoothed or slow-shifted) to compensate for (or to conceal) inter-frame discontinuities. The shift estimator 121 may also determine a sign (e.g., a positive sign or a negative sign) of the mismatch value based on whether the shift has changed direction compared to a previous mismatch value.

Figure 2:
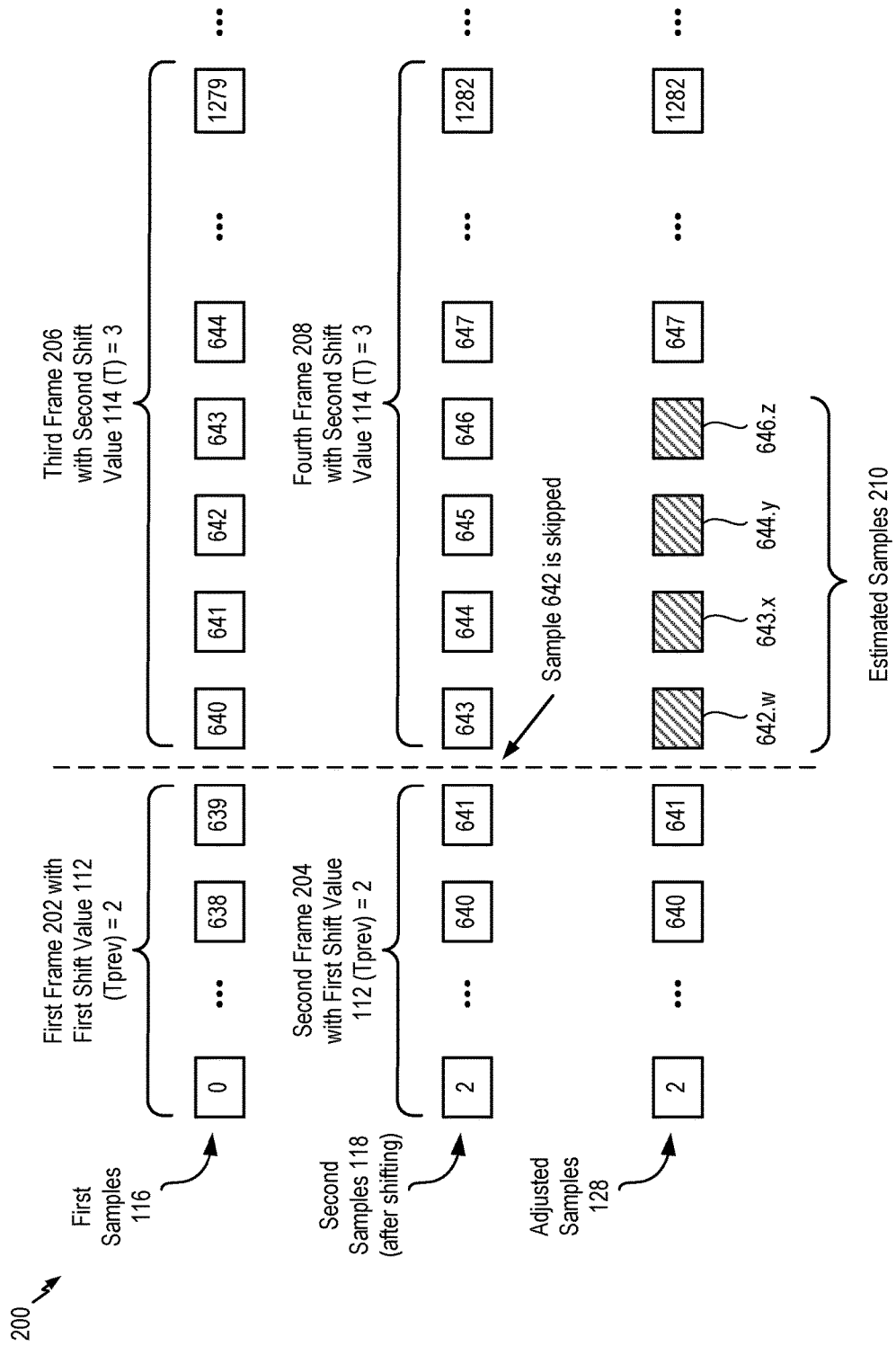
FIG. 2 is a diagram illustrating a first particular example of samples that may be adjusted based on a variation between mismatch values.
Figure 3:
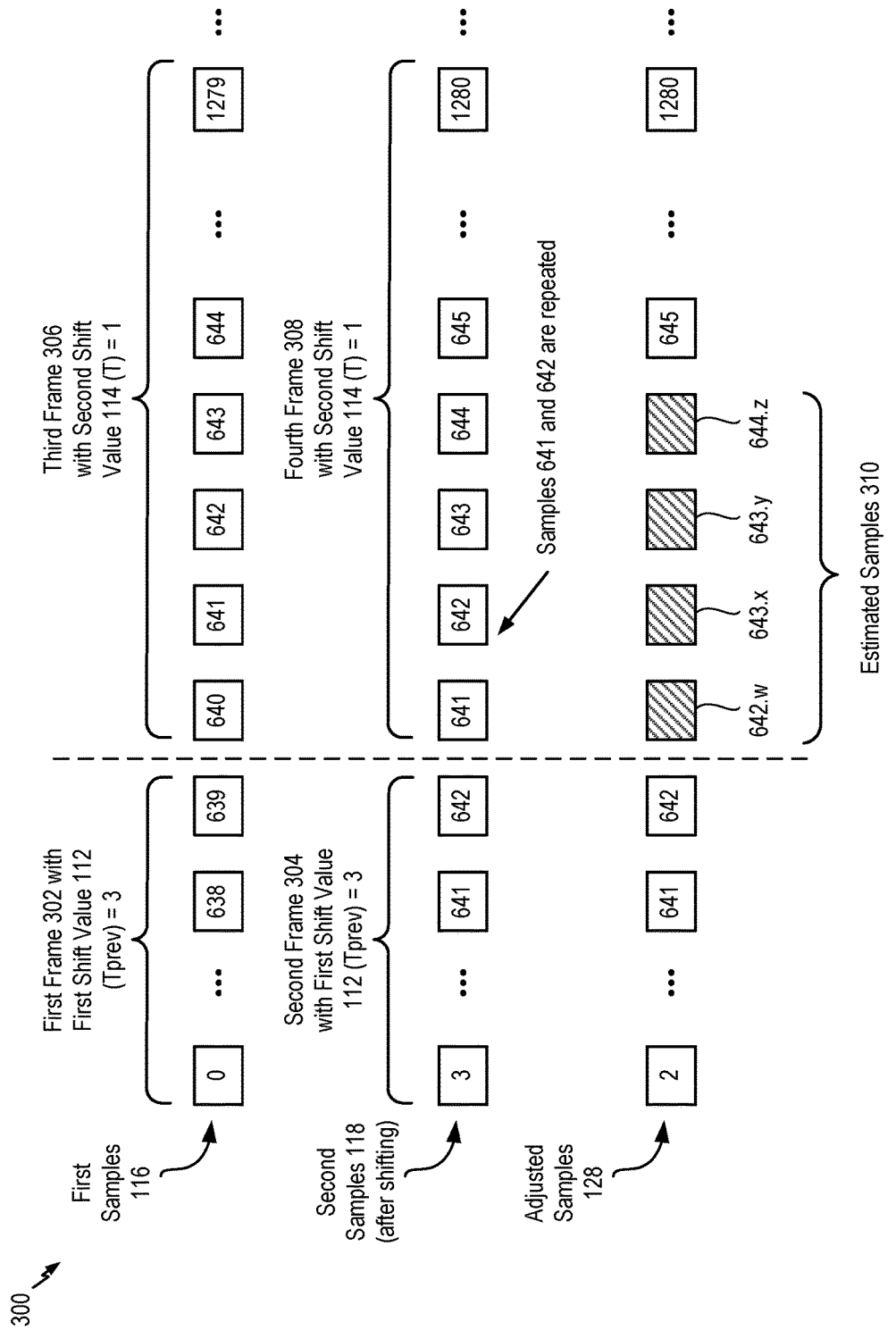
FIG. 3 is a diagram illustrating a second particular example of samples that may be adjusted based on a variation between mismatch values.

After determining mismatch values (e.g., the first mismatch value 112 and the second mismatch value 114), the target channel may be shifted for a frame based on the corresponding mismatch value. In a particular example, the second audio signal 146 is the target channel for both the frames corresponding to the second audio signal 146, the second frame of the second audio signal 146 is shifted based on the first mismatch value 112, and the fourth frame of the second audio signal 146 is shifted based on the second mismatch value 114. For example, a portion of the second samples 118 corresponding to the second frame may be time-shifted relative to a portion of the first samples 116 corresponding to the first frame by an amount that is based on the first mismatch value 112, and a portion of the second samples 118 corresponding to the fourth frame may be time-shifted relative to a portion of the second samples 118 corresponding to the third frame by an amount that is based on the second mismatch value 114. FIGS. 2-3 illustrate time-shifting samples of the second audio signal 146 to temporally align the second audio signal 146 with the first audio signal 142.

In order to time-shift samples of the target channel (e.g., the second audio signal 146), the encoder 120 may access "future" values of the target channel. In a particular implementation, the first device 102 includes a buffer that stores samples of the first audio signal 142 and the second audio signal 146, and the encoder 120 may be able to access samples that occur sequentially prior to a particular sample. In some implementations, the buffer may include or correspond to a lookahead buffer that is used to perform speech processing operations at the first device 102. Because samples that occur subsequent to a particular sample (e.g., a "current" sample) of the target channel are available in the buffer, the target channel (e.g., the second audio signal 146) may be time-shifted by aligning a sequentially subsequent sample of the target channel to a particular sample of the reference channel, as further described with reference to FIGS. 2-3.

If the first mismatch value 112 and the second mismatch value 114 do not have the same value (e.g., are not equal), there may be a discontinuity between the second frame and the fourth frame of the second audio signal 146. To compensate for (or conceal) the discontinuity, the encoder 120 may adjust the second samples 118 (e.g., the samples of the target channel) to reduce inter-frame discontinuities. Adjusting the target channel may also be referred to as "smoothing" or "slow-shifting" the target channel. The encoder 120 may adjust the second samples 118 for frames for which the second audio signal 146 is identified as the target channel. Alternatively, the encoder 120 may adjust the first samples 116 for frames for which the first audio signal 142 is identified as the target channel. Thus, which samples are adjusted (e.g., which audio channel is "smoothed" or "slow-shifted") depends on which audio channel is identified as the target channel for a particular frame.

To enable the adjustment of the target channel, the encoder 120 may be configured to determine a difference 124 between a first mismatch value 112 and a second mismatch value 114. For example, the encoder 120 may include a comparator 122 configured to determine the difference 124. The comparator 122 may be configured to subtract the first mismatch value 112 from the second mismatch value 114 to determine the difference 124. The first mismatch value 112 may be indicative of a shift of the first frame of the first audio signal 142 relative to the second frame of the second audio signal 146, and the second mismatch value 114 may be indicative of a shift of the third frame of the first audio signal 142 relative to the fourth frame of the second audio signal 146. As a particular example, the first mismatch value 112 may be two samples, the second mismatch value 114 may be three samples, and the difference 124 may be one sample. The difference 124 may be a signed value (e.g., a positive value or a negative value). A positive value for the difference 124 may indicate that the delay of the target channel as compared to the reference channel is increasing, a negative value for the difference 124 may indicate that the delay of the target channel as compared to the reference channel is decreasing, and a value of zero for the difference 124 may indicate that the delay remains the same (or nearly the same) between the second frame and the fourth frame.

The encoder 120 may be configured to adjust the second samples 118 based on the difference 124 to generate an adjusted set of samples 128. For example, the encoder may include a sample adjuster 126 configured to adjust the second samples 118 based on the difference 124 to generate the adjusted set of samples 128. In a particular implementation, the sample adjuster 126 may be configured to interpolate a portion of the second samples 118 based on the difference 124 to generate a set of estimated samples, and the sample adjuster 126 may be configured to replace the portion with the set of estimated samples to generate the adjusted samples 128. The portion of samples may include samples from a single audio frame of the target channel, or from multiple frames of the target channel. For example, if a discontinuity exists between a second frame of the target channel (corresponding to a first frame of the reference channel) and a fourth frame of the target channel (corresponding to a third frame of the reference channel), in a particular implementation, the sample adjuster 126 may adjust samples corresponding to the fourth frame. In another particular implementation, the sample adjuster 126 may adjust samples corresponding to the second frame. In another particular implementation, the sample adjuster 126 may adjust samples corresponding to the second frame and the fourth frame.

A first particular example of adjusting samples based on the difference 124 is illustrated in FIG. 2. FIG. 2 includes a diagram 200 that illustrates the first samples 116, the second samples 118, and the adjusted samples 128. The samples illustrated in FIG. 2 include the first samples 116 that correspond to the first audio signal 142 and the second samples 118 that correspond to the second audio signal 146. Each of the frames of the audio signals 142 and 146 may correspond to a particular number of samples, or to a particular duration of time and a particular sample rate. In the particular example illustrated in FIG. 2, each frame includes 640 samples that are sampled at a particular sampling rate (e.g., 32 kilo-Hertz (kHz)), which corresponds to 20 milliseconds (ms). In other implementations, frames may include fewer than 640 or more than 640 samples. As an example, each frame may include 960 samples that are sampled at 48 kHz, which may correspond to 20 ms.

As described above, the first audio signal 142 may be the reference channel, and the second audio signal 146 may be the target channel. The second audio signal 146 may be received at a delay relative to the first audio signal 142. The shift estimator 121 may determine the first mismatch value 112 and the second mismatch value 114 that are used to temporally align frames of the first audio signal 142 and the second audio signal 146. In the particular example illustrated in FIG. 2, the first mismatch value 112 (Tprev) is two and the second mismatch value 114 (T) is three. In order to temporally align a first frame 202 of the first audio signal 142 with a second frame 204 of the second audio signal 146, a group of the second samples 118 corresponding to the second frame 204 are shifted by two samples. To illustrate, the shift estimator 121 may receive an "input frame" (e.g., a first frame of the first audio signal 142 and a second frame of the second audio signal 146) including samples 0-639 of each audio channel. The shift estimator 121 may determine a mismatch value to temporally align the target channel with the reference channel, and the shift estimator 121 may shift the target channel by the mismatch value to generate a "shifted frame" that includes the first frame of the reference channel and a shifted second frame of the target channel. For example, samples 2-641 of the second samples 118 are aligned with samples 0-639 of the first samples 116 to generate the shifted frame. In order to temporally align a third frame 206 of the first audio signal 142 with a fourth frame 208 of the second audio signal 146, a group of the second samples 118 corresponding to the fourth frame 208 are shifted by three samples. The shift estimator 121 may receive a second input frame (e.g., a third frame of the first audio signal 142 and a fourth frame of the second audio signal 146) including samples 640-1279 of each audio channel. The shift estimator 121 may determine a second mismatch value to temporally align the target channel with the reference channel, and the shift estimator 121 may shift the target channel by the mismatch value to generate a second shifted frame that includes the third frame of the reference channel and a shifted fourth frame of the target channel. For example, samples 643-1282 of the second samples 118 are aligned with samples 640-1279 of the first samples 116 to generate the second shifted frame. After generating the shifted frame and the second shifted frame, the sample adjuster 126 may adjust samples of the second shifted frame to generate an adjusted second shifted frame to compensate for (or conceal) a discontinuity between the shifted frame and the second shifted frame.

When the first mismatch value 112 and the second mismatch value 114 are different, a discontinuity may exist at the boundary between the second frame 204 and the fourth frame 208. If the second mismatch value 114 is greater than the first mismatch value 112, one or more samples may be skipped. As shown in FIG. 2, sample 642 is skipped due to the difference 124 (e.g., a one frame difference) between the second mismatch value 114 and the first mismatch value 112. Thus, audio corresponding to sample 642 may not be encoded by the encoder 120 as part of the encoded channels 180. When the encoded channels 180 (with the discontinuity between frames) are decoded and played back at the second device 160, a click, a pop, a hiss, or another audio sound may be heard due to the missing sample. As the number of samples that are skipped increases, the clicks and other audio sounds may become more noticeable to a listener.

To compensate for (or to conceal) discontinuities between frames, the sample adjuster 126 of the encoder 120 may adjust the second samples 118 based on the difference 124. Adjusting the second samples 118 may include interpolating a portion of the second samples 118 based on the difference 124 to generate the estimated samples 210. For example, the sample adjuster 126 may interpolate a subset of the second samples 118 that correspond to the fourth frame 208. Alternatively, the sample adjuster 126 may interpolate a subset of the second samples 118 that correspond to the second frame 204, or a subset of samples that correspond to the second frame 204 and the fourth frame 208. The interpolation may be performed on a number of samples corresponding to a spreading factor N_SPREAD. Interpolating the subset of samples to generate the estimated samples 210 may spread out (e.g., smoothed out or slow-shifted) the discontinuity over a number of samples corresponding to the spreading factor N_SPREAD. In a particular implementation, a value of the spreading factor N_SPREAD is less than a number of samples N in the corresponding frame (e.g., the fourth frame 208). Alternatively, a value of the spreading factor N_SPREAD may be equal to the number of samples N in the corresponding frame. In other alternatives, the spreading factor N_SPREAD can be greater than N and spreading can be performed over multiple frames. For example, a discontinuity between two frames (e.g., the second frame 204 and the fourth frame 208 in FIG. 2) may be spread out over multiple frames using a spreading factor N_SPREAD having a value that is greater than N. Using a large spreading factor N_SPREAD (e.g., N_SPREAD greater than or equal to N) may increase the smoothness with which the discontinuity is spread out over the samples.

In the example illustrated in FIG. 2, the value of the spreading factor N_SPREAD is four samples. In other implementations, the value of the spreading factor N_SPREAD may be fewer than four or more than four samples. In a particular implementation, the value of the spreading factor N_SPREAD is 528 samples. The spreading factor may be stored in the encoder 120 or the memory 110. In a particular implementation, the spreading factor is a preprogrammed value that is selected (e.g., during manufacture or programming of the first device 102, during a software or firmware installation or update, etc.) based on a target smoothness level of audio channels or a target level of processing to be devoted to channel adjusting. To illustrate, a high value for the spreading factor N_SPREAD may increase a smoothness of the channel adjustment (e.g., the interpolation may be performed using a higher granularity) while increasing the processing resources used to perform the channel adjustment, and a low value for the spreading factor N_SPREAD may reduce the processing resources used to perform the channel adjustment while reducing the smoothness of the channel adjustment (e.g., the interpolation may be performed using a lower granularity).

In another particular implementation, a value of the spreading factor N_SPREAD is based on an audio smoothness setting. For example, a user may select an audio smoothness setting, and the spreading factor N_SPREAD may be determined by the first device 102 (e.g., by the sample adjuster 126) based on the audio smoothness setting. Additionally or alternatively, the value of the spreading factor N_SPREAD may be based on a frame type of the audio channels, a sample rate of the audio channels, a pitch of the audio channels, past delay heuristics, or a combination thereof. As an illustrative example, the spreading factor N_SPREAD may be varied between 64 samples and 580 samples based on the frame type, the sample rate, the pitch, the past delay heuristics, or a combination thereof. In another particular implementation, a threshold value of the difference D (e.g., between mismatch values of adjacent frames) may be based on a frame type of the target channel. The encoder 120 may determine a frame type of the second audio signal 146 (e.g., the target channel) and the encoder 120 may ensure that a value of D does not exceed a particular threshold based on the frame type. For example, the encoder 120 or the memory 110 may store a table (or other data structure) that maps threshold values of D to frame types. The frame type may include speech, music, noise, or other audio types. As a particular example, speech may be associated with a threshold value of four (e.g., a difference between mismatch values of adjacent frames of speech may not exceed four), music may be associated with a threshold value of one (e.g., a difference between mismatch values of adjacent frames of music may not exceed one), and noise may be associated with a threshold value of twenty (e.g., a difference between mismatch values of adjacent frames of noise may not exceed twenty). As an illustrative example where speech is associated with a threshold value of four frames, if a previous frame has a mismatch value of one, a mismatch value determined for a current frame does not exceed five, such that the difference between the mismatch value of the current frame and the previous frame does not exceed four frames (e.g., the threshold value associated with speech frames). Additionally or alternatively, the threshold value may be based on a periodicity of the audio channels, a temporal/spectral sparseness of the audio channels, the frame type, or a combination thereof.

To spread out the inter-frame discontinuity among samples of the fourth frame 208, the sample adjuster 126 generates the estimated samples 210, which include four estimated samples in the example illustrated in FIG. 2. The estimated samples 210 are generated by interpolating the last sample of the previous frame (e.g., sample 641 of the second frame 204) and the first four samples of the current frame (e.g., the fourth frame 208). For example, the estimated samples 210 may include samples 642.w, 643.x, 644.y, and 646.z. In a particular implementation, the estimated samples 210 may have uniform spacing between estimated samples. In this implementation, the estimated samples may be generated using an interpolation factor that is based on the equation:

$$\text{Interpolation factor} = D/N\_SPREAD \qquad \text{Equation 4}$$

where D is the difference between the current frame and the previous frame (e.g., the difference 124), and where N_SPREAD is the spreading factor. As illustrated in FIG. 2, the estimated samples 210 may include estimations of samples 642.w, 643.x, 644.y, and 646.z. In an illustrative embodiment where the estimated samples are uniformly spaced, D is one, N_SPREAD is four, and the interpolation factor is ¼ (e.g., 0.25). In this example, the estimated samples 210 include estimations of samples 642.25, 643.5, 644.75, and 646. When the difference 124 is positive (e.g., greater than zero), the estimated samples 210 correspond to a lower sampling rate than the second samples 118. For example, the estimated samples 210 are associated with a sampling rate of 1.25, which is lower than the sampling rate of 1 associated with the second samples 118. In other implementations (e.g., when D or N_SPREAD has a different value), the estimated samples 210 (and other samples) may represent estimations of other samples, such as fractional samples (e.g., samples between two existing samples, such as 642.25, as an illustrative example). Alternatively, the estimated samples 210 may be associated with a non-uniform spacing. For example, a difference between the samples w and x may be different than a difference between the samples x and y. As an illustrative example, when the estimated samples 210 are associated with non-uniform spacing, the estimated samples 210 may include estimations of samples 642.25, 643, 644.5, and 646.

The estimated samples 210 may include estimations of samples that are not included in the second samples 118. To generate the estimated samples 210, the sample adjuster 126 performs interpolation on the subset of the second samples 118 (e.g., the number of samples indicated by the spreading factor N_SPREAD). In a particular implementation, the interpolation includes a sinc interpolation (e.g., a "Whittaker-Shannon" interpolation). In this implementation, the sample adjuster 126 (or the memory 110) may store multiple sets of filter coefficients corresponding to different interpolation factors. The sample adjuster 126 may determine the interpolation factor (using Equation 4) and apply the corresponding set of filter coefficients to the subset of samples to generate the estimated samples 210. If no set of filter coefficients exactly matches the determined interpolation factor, a nearest-matching set of filter coefficients may be identified and used to generate the estimated samples 210. Complexity of the sinc interpolation, and therefore processing resources used to perform the sinc interpolation, may change according to a step size used in the interpolation.

In another particular implementation, the interpolation includes a Lagrange interpolation. In this implementation, the sample adjuster 126 performs Lagrange interpolation based on the interpolation factor. In this implementation, no filter coefficients are stored within the sample adjuster 126 (or the memory 110). Because the Lagrange interpolation does not use stored filter coefficients, the Lagrange interpolation may use less processing resources than the sinc interpolation. In another particular implementation, the interpolation includes a hybrid interpolation. The hybrid interpolation may use any combination of interpolation techniques. As an illustrative example, the hybrid interpolation may include a combination of sinc interpolation and Lagrange interpolation. For example, performing the hybrid interpolation may include performing a second-order or fourth-order sinc interpolation, followed by performing a Lagrange interpolation having a 64 sample precision. The hybrid interpolation may combine the precision of the sinc interpolation with the reduced processing and memory usage of the Lagrange interpolation. In other implementations, other combinations of sinc interpolations and Lagrange interpolations are used. In other implementations, other methods of interpolation or smoothing may be used, such as fractional delay filters, re-sampling, or inter-frame overlapping.

In another particular implementation, the interpolation may be performed using window fading. To illustrate, the sample adjuster 126 may determine that a first shift value of the target channel (with respect to the reference channel) is equal to three samples (e.g., a three-sample shift) and may store the first shift value in a first buffer. The sample adjuster 126 may determine that a second shift value of the target channel is equal to four samples and may store the second shift value in a second buffer. The final samples of the interpolated target channel may be based on a weighted combination of the shift values in the first and second buffers. For example, the final samples of the interpolated target channel may be expressed as target_final(n)=w(n) *target(n+3)+(1−w(n))*target(n+4), where, w(n) is a window which smoothly increases from 0 to 1. Thus, the target_final(0)=target(n+3) and target_final(N)=target(n+4) where N is the number of samples over which the shift is adapted.

Thus, different modes of interpolation may be used according to the techniques described herein. According to one implementation, a first mode of interpolation may be used for a first portion of the set of target samples (e.g., the second samples 118), and a second mode of interpolation may be used for a second portion of the set of target samples. The first portion of the set of target samples may be associated with a first target frame, and the second portion of the set of target samples may be associated with a second target frame.

After generating the estimated samples 210, the sample adjuster 126 may replace the subset of the samples 118 with the estimated samples 210 to generate the adjusted samples 128 (e.g., the second adjusted frame). In the adjusted samples 128, the discontinuity between the second frame 204 and the fourth frame 208 is spread out over the estimated samples 210. For example, instead of sample 641 being followed by sample 643 (with sample 642 being skipped), sample 641 is followed by estimations of samples 642.25, 643.5, 644.75, and 646. Spreading the one-frame difference out among four frames (e.g., as a 0.25 frame difference in FIG. 2) reduces (or conceals) the inter-frame discontinuity between the second frame 204 and the fourth frame 208. The sample adjuster 126 may similarly adjust samples of the reference channel at each frame boundary to reduce (or conceal) other inter-frame discontinuities. Thus, FIG. 2 illustrates an example of generating the adjusted samples 128 when the difference 124 is positive (e.g., greater than zero) to avoid skipping samples between frames.

A second particular example of adjusting samples based on the difference 124 is illustrated in FIG. 3. FIG. 3 includes a diagram 300 that illustrates the first samples 116, the second samples 118, and the adjusted samples 128. In the example illustrated in FIG. 3, the difference 124 is negative (e.g., less than zero). The samples illustrated in FIG. 3 include the first samples 116 that correspond to the first audio signal 142 and the second samples 118 that correspond to the second audio signal 146. Each of the frames of the audio signals 142 and 146 may correspond to a particular number of samples, or to a particular duration of time and a particular sample rate. In the particular example illustrated in FIG. 3, each frame includes 640 samples that are sampled at a particular sampling rate (e.g., 32 kilo-Hertz (kHz)), which corresponds to 20 milliseconds (ms). In other implementations, frames may include fewer than 640 or more than 640 samples. As an example, each frame may include 960 samples that are sampled at 48 kHz, which may correspond to 20 ms.

As described above, the first audio signal 142 may be the reference channel, and the second audio signal 146 may be the target channel. The second audio signal 146 may be received at a delay relative to the first audio signal 142. The shift estimator 121 may determine the first mismatch value 112 and the second mismatch value 114 that are used to temporally align frames of the first audio signal 142 and the second audio signal 146. In the particular example illustrated in FIG. 3, the first mismatch value 112 (Tprev) is three and the second mismatch value 114 (T) is one. In order to temporally align a first frame 302 of the first audio signal 142 with a second frame 304 of the second audio signal 146, a group of the second samples 118 corresponding to the second frame 304 are shifted by three samples. To illustrate, the shift estimator 121 may receive an input frame (e.g., a first frame of the first audio signal 142 and a second frame of the second audio signal 146) including samples 0-639 of each audio signal. The shift estimator 121 may determine a mismatch value to temporally align the target channel with the reference channel, and the shift estimator 121 may shift the target channel by the mismatch value to generate a "shifted frame" that includes the first frame of the reference channel and a shifted second frame of the target channel. For example, samples 3-642 of the second samples 118 are aligned with samples 0-639 of the first samples 116 to generate the shifted frame. The shift estimator 121 may receive a second input frame (e.g., a third frame of the first audio signal 142 and a fourth frame of the second audio signal 146) including samples 640-1279 of each audio signal. The shift estimator 121 may determine a second mismatch value to temporally align the target channel with the reference channel, and the shift estimator 121 may shift the target channel by the mismatch value to generate a second shifted frame that includes the third frame of the reference channel and a shifted fourth frame of the target channel. In order to temporally align a third frame 306 of the first audio signal 142 with a fourth frame 308 of the second audio signal 146, a group of the second samples 118 corresponding to the fourth frame 208 are shifted by one sample. For example, samples 641-1280 of the second samples 118 are aligned with samples 640-1279 of the first samples 116 to generate the second shifted frame. After generating the shifted frame and the second shifted frame, the sample adjuster 126 may adjust samples of the second shifted frame to generate an adjusted second shifted frame to compensate for (or conceal) a discontinuity between the shifted frame and the second shifted frame.

As described above, when the first mismatch value 112 and the second mismatch value 114 are different, a discontinuity may exist at the boundary between the second frame 304 and the fourth frame 308. If the second mismatch value 114 is less than the first mismatch value 112, one or more samples may be repeated. As shown in FIG. 3, samples 641 and 642 are repeated due to the difference 124 (e.g., a two frame difference) between the second mismatch value 114 and the first mismatch value 112. Thus, audio corresponding to samples 641 and 642 may not be encoded twice by the encoder 120 as part of the encoded signals 180. When the encoded signals 180 (with the encoding of the repeated samples) are decoded and played back at the second device 160, a click, a pop, a hiss, or another audio sound may be heard due to the missing sample. As the number of samples that are repeated increases, the clicks and other audio sounds may become more noticeable to a listener.

To compensate for (or to conceal) discontinuities between frames, the sample adjuster 126 of the encoder 120 may adjust the second samples 118 based on the difference 124. Adjusting the second samples 118 may include interpolating a portion of the second samples 118 based on the difference 124 to generate the estimated samples 310. For example, the sample adjuster 126 may interpolate a subset of the second samples 118 that correspond to the fourth frame 308. Alternatively, the sample adjuster 126 may interpolate a subset of the second samples 118 that correspond to the second frame 304, or a subset of samples that correspond to the second frame 304 and the fourth frame 308. The interpolation may be performed on a number of samples corresponding to a spreading factor N_SPREAD. Interpolating the subset of samples to generate the estimated samples 310 may spread out (e.g., smoothed out or slow-shifted) the discontinuity over a number of samples corresponding to the spreading factor M. In the example illustrated in FIG. 3, the value of the spreading factor N_SPREAD is four samples. In other implementations, the value of the spreading factor N_SPREAD may be fewer than four or more than four samples.

To spread out the inter-frame discontinuity among samples of the fourth frame 308, the sample adjuster 126 generates the estimated samples 310, which include four estimated samples in the example illustrated in FIG. 3. The estimated samples 310 are generated by interpolating the last sample of the previous frame (e.g., sample 642 of the second frame 304) and the first four samples of the current frame (e.g., the fourth frame 308). For example, the estimated samples 310 may include samples 642.w, 643.x, 643.y, and 644.z. In a particular implementation, the estimated samples 310 may have uniform spacing between estimated samples. In this implementation, the estimated samples may be generated using an interpolation factor that is based on Equation 4. As illustrated in FIG. 3, the estimated samples 310 may include estimations of samples 642.w, 643.x, 643.y, and 644.z. In an illustrative embodiment where the estimated samples are uniformly spaced, D is two, N_SPREAD is four, and the interpolation factor is ⅔ (e.g., 0.5). In this example, the estimated samples 310 include estimations of samples 642.5, 643, 643.5, and 644. When the difference 124 is negative (e.g., less than zero), the estimated samples 310 correspond to a higher sampling rate than the second samples 118. For example, the estimated samples 310 are associated with a sampling rate of 0.5, which is higher than the sampling rate of 1 associated with the second samples 118. Alternatively, the estimated samples 310 may be associated with a non-uniform spacing, and the estimated samples 310 may include different values (e.g., values for w, x, y, and z) than described above.

After generating the estimated samples 310, the sample adjuster 126 may replace the subset of the samples 118 with the estimated samples 310 to generate the adjusted samples 128 (e.g., the second adjusted frame). In the adjusted samples 128, the discontinuity between the second frame 304 and the fourth frame 308 is spread out over the estimated samples 310. For example, instead of samples 641 and 642 being repeated after sample 642, sample 642 is followed by estimations of samples 642.5, 643, 643.5, and 644. Spreading the two-frame difference out among four frames (e.g., as a 0.5 frame difference in FIG. 3) reduces (or conceals) the inter-frame discontinuity between the second frame 304 and the fourth frame 308. The sample adjuster 126 may similarly adjust samples of the reference channel at each frame boundary to reduce (or conceal) other inter-frame discontinuities. Thus, FIG. 3 illustrates an example of generating the adjusted samples 128 when the difference 124 is negative (e.g., less than zero) to avoid repeating samples between frames.

Returning to FIG. 1, after generation of the adjusted samples 128, the channel generator 130 may generate the encoded channels based on the first samples 116 (e.g., samples of the reference channel) and the adjusted samples 128. The channel generator 130 may perform stereo encoding to generate a mid-channel and a side-channel (or side channel parameters) based on the first samples 116 and the adjusted samples 128, and the encoded channels 180 may include the mid-channel and the side-channel (or the side channel parameters). In other examples, when the reference channel 142 is the target channel and the target channel 146 is the reference channel, the first samples 116 may be adjusted to generate the adjusted samples 128, and the channel generator 130 may generate the encoded channels 180 based on the adjusted samples 128 and the second samples 118 (e.g., samples of the reference channel). The encoded channels 180 may be transmitted, via a network interface of the one or more interfaces 104, to the second device 160 for decoding and playback at the second device 160.

In a particular implementation, the encoder 120 may be configured to select one of the first audio signal 142 and the second audio signal 146 as the reference channel and to select one of the first audio signal 142 and the second audio signal 146 as the target channel prior to time-shifting and adjusting the reference channel. For example, the encoder 120 may include a reference channel designator configured to select one of the first audio signal 142 and the second audio signal 146 as the reference channel and to select the other of the first audio signal 142 and the second audio signal 146 as the target channel for a first time period based on the first mismatch value 112. The reference channel designator may also be configured to select one of the first audio signal 142 and the second audio signal 146 as the reference channel and to select the other of the first audio signal 142 and the second audio signal 146 as the reference channel for a second time period based on the second mismatch value 114. Selection of the reference channel and the target channel is further described with reference to FIG. 6.

The first device 102 may transmit additional information along with the encoded signals 180. As an example, the first device 102 may transmit mismatch values 182 to the second device 160. The mismatch values 182 may include "non-causal" mismatch values that are determined based on the first mismatch value 112 and the second mismatch value 114. For example, the mismatch values 182 may include a first non-causal mismatch value that represents an unsigned version of the first mismatch value 112 (e.g., a result of an absolute value operation performed on the first mismatch value 112). The mismatch values 182 may also include a second non-causal mismatch value that represents an unsigned version of the second mismatch value 114 (e.g., a result of an absolute value operation performed on the second mismatch value 114). As another example, the first device 102 may transmit a reference channel indicator 184 to the second device 160. A value of the reference channel indicator 184 may identify either the first audio signal 142 or the second audio signal 146 as the reference channel. For example, a first particular value (e.g., a logical zero value) of the reference channel indicator 184 may indicate that the first audio signal 142 is the reference channel, and a second particular value (e.g., a logical one value) of the reference channel indicator 184 may indicate that the second audio signal 146 is the reference channel. Additionally or alternatively, the first device 102 may transmit other values, such as gain parameters, to the second device 160. The additional information (e.g., the mismatch values 182, the reference channel indicator 184, gain parameters, etc.) may be transmitted via the network interface of the one or more interfaces 104 and may be used by the second device 160 to decode the encoded signals 180.

The second device 160 may include a decoder 162. The second device 160 may include additional components, such as a processor, a memory, one or more interfaces, a transmitter, a receiver, a transceiver, or a combination thereof, which are not illustrated for convenience. The decoder 162 may be configured to decode the encoded channels 180 and to render multiple audio channels for playback at the second device 160. In a particular implementation, decoding the encoded channels 180 includes up-mixing the encoded channels 180. The second device 160 may be coupled to a first speaker 170, a second speaker 174, or both, to enable playback of the audio channels. For example, the decoder 162 may generate a first output channel 172 for playback via the first speaker 170, and the decoder 162 may generate a second output channel 176 for playback via the second speaker 174.

In the example illustrated in FIG. 1, adjustment (e.g., smoothing or slow-shifting) of the target channel is described as being performed by the encoder 120 of the first device 102. In other implementations, the adjustment of audio channels may be performed by the decoder 162 of the second device 160. Details regarding target channel adjustment at a decoder are further described with reference to FIG. 4.

During operation, the first device receives the first audio signal 142 from the first microphone 140 and the second audio signal 146 from the second microphone 144 via the one or more interfaces 104. The first device 102 may generate the first samples 116 and the second samples 118 based on the first audio signal 142 and the second audio signal 146, respectively. The second audio signal 146 may be delayed relative to the first audio signal 142 due to a location of the sound source 150 (e.g., when the sound source 150 is closer to the first microphone 140 than to the second microphone 144). The encoder 120 may be configured to identify the first audio signal 142 as a reference channel and the second audio signal 146 as a target channel based on the second audio signal 146 being delayed relative to the first audio signal 142. Alternatively, if the first audio signal 142 is delayed relative to the second audio signal 146 (e.g., if the sound source 150 is closer to the second microphone 144 than to the first microphone 140), the encoder 120 may identify the first audio signal 142 as the target channel and the second audio signal 146 as the reference channel. Additional details of identification of the target channel and the reference channel are described with reference to FIGS. 5-6.

After the second audio signal 146 is identified as the target channel, the shift estimator 121 of the encoder 120 may determine the first mismatch value 112 and the second mismatch value 114. The first mismatch value 112 may be indicative of a shift of a first frame of the first audio signal 142 relative to a second frame of the second audio signal 146, and the second mismatch value 114 may be indicative of a shift of a third frame of the first audio signal 142 relative to a fourth frame of the second audio signal 146. The mismatch values 112 and 114 may be stored in the memory 110 and used to shift the second samples 118 (or the first samples 116 if the first audio signal 142 is the target channel). Additionally, the first mismatch value 112 and the second mismatch value 114 may be provided to the comparator 122 of the encoder 120. The comparator 122 may determine the difference 124 between the first mismatch value 112 and the second mismatch value 114. The sample adjuster 126 may receive the difference 124 and the second samples 118 (or the first samples 116 if the first audio signal 142 is the target channel), and the sample adjuster 126 may adjust the second samples 118 based on the difference 124. For example, the sample adjuster 126 may interpolate a subset of the second samples 118 based on the difference 124 to generate estimated samples, and the sample adjuster 126 may replace the subset of the second samples 118 with the estimated samples to generate the adjusted samples 128. If the difference 124 is positive, the estimated samples may conceal one or more skipped samples (as described with reference to FIG. 2), and if the difference 124 is negative, the estimated samples may conceal one or more repeated samples (as described with reference to FIG. 3).

The channel generator 130 of the encoder 120 may receive the adjusted samples 128 and may generate the encoded channels 180 (e.g., at least one encoded channel) based on the adjusted samples 128 and the first samples 116. In a particular implementation, the encoded channels 180 include a mid-channel and a side-channel. The encoded channels 180 may be transmitted from the first device 102 (e.g., using a network interface of the one or more interfaces 104) to the second device 160 via the network 152. Additional information, such as the mismatch values 182 and the reference channel indicator 184 may also be transmitted to the second device 160. The second device 160 may receive the encoded channels 180 (and the additional information), and the decoder 162 may decode the encoded channels 180 to generate the first output channel 172 and the second output channel 176. For example, the decoder 162 may decode and up mix the encoded channels 180 to generate the output channels 172 and 176. The first output channel 172 may be output by the first speaker 170, and the second output channel 176 may be output by the second speaker 174.

The system 100 of FIG. 1 enables compensation for (or concealment of) inter-frame discontinuities caused by time-shifting a reference channel. For example, by generating the adjusted samples 128 based on the difference 124 between the first mismatch value 112 and the second mismatch value 114, the second audio signal 146 may be adjusted to spread out (e.g., smooth or slow-shift) an inter-frame discontinuity over a number of estimated samples. Spreading out the discontinuity may reduce a difference between a pair of samples of the second samples 118 (e.g., samples of the target channel) as compared to skipping or repeating one or more samples. Adjusting the samples of the target channel to reduce (or conceal) inter-frame discontinuities may result in a higher quality encoded channel while maintaining the increased number of bits used to encode the mid-channel due to time-shifting the target channel. When the encoded channels 180 are decoded and played back at the second device 160, clicks or other audio sounds caused by the inter-frame discontinuities may be reduced (or eliminated), thereby enhancing a clarity of decoded output channels and enhancing a listener's experience.

In the above description, various functions performed by the system 100 of FIG. 1 are described as being performed by certain components. This division of components is for illustration only. In an alternate implementation, a function performed by a particular component may instead be divided amongst multiple components. Moreover, in an alternate implementation, two or more components of FIG. 1 may be integrated into a single component. Each component illustrated in FIG. 1 may be implemented using hardware (e.g., a field-programmable gate array (FPGA) device, an application-specific integrated circuit (ASIC), a DSP, a controller, etc.), software (e.g., instructions executable by a processor), or a combination thereof.

Figure 4:
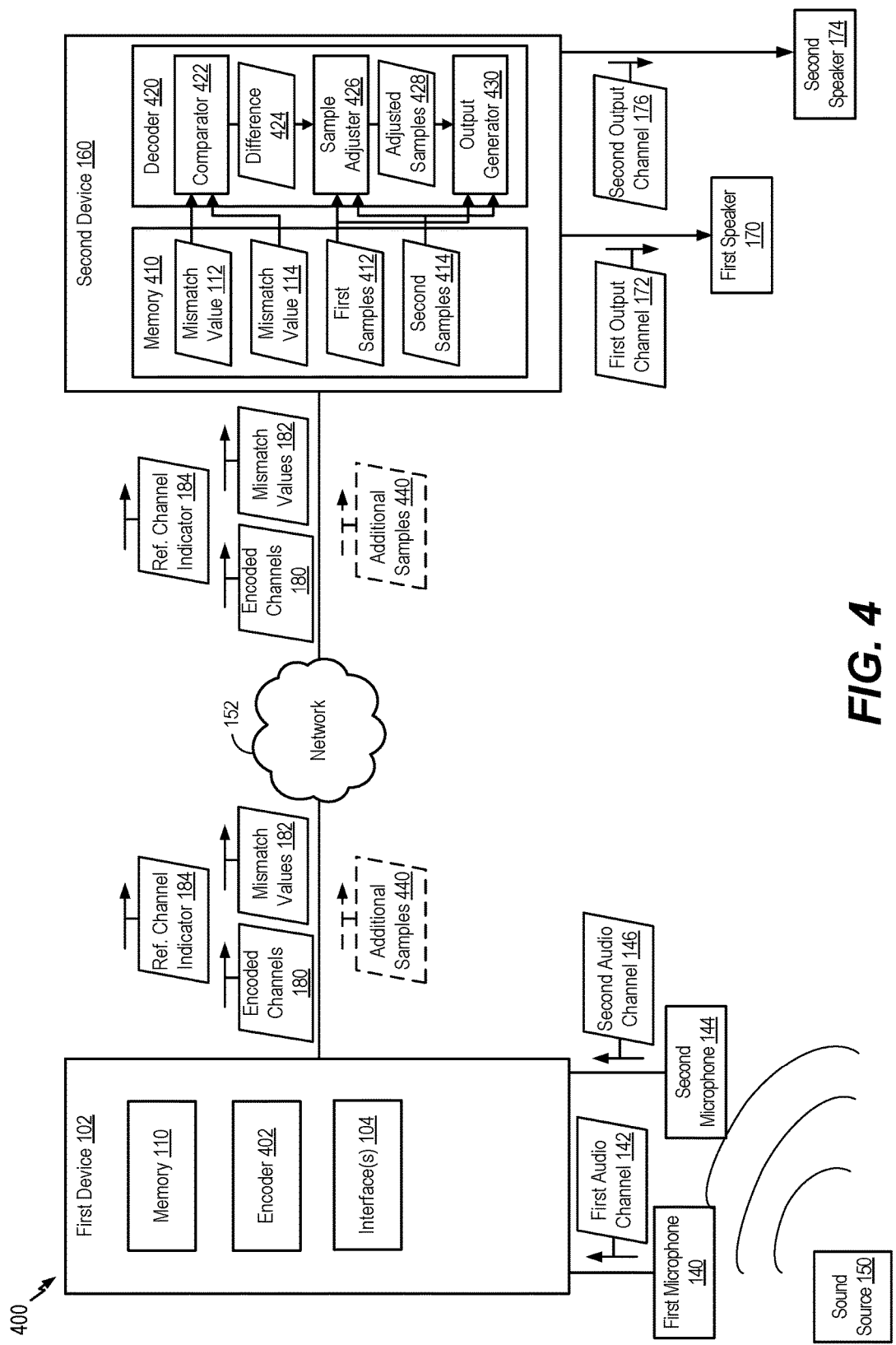
FIG. 4 is a block diagram of a second particular implementation of a system that includes a device configured to adjust audio samples based on a variation between mismatch values.

Referring to FIG. 4, a diagram of a second particular implementation of a system that includes a device configured to adjust audio samples based on a difference between mismatch values is shown and generally designated 400. The system 400 may represent an alternate implementation of the system 100 of FIG. 1 where a decoder performs channel adjusting to reduce (or conceal) inter-frame discontinuities. The system 400 may include the first device 102, the second device 160, the network 152, the first microphone 140, the second microphone 144, the sound source 150, the first speaker 170, and the second speaker 174 of FIG. 1.

In FIG. 4, the first device 102 includes the memory 110, an encoder 402, and the one or more interfaces 104. The encoder 402 may be configured to time-shift a target channel (e.g., one of the first audio signal 142 and the second audio signal 146) to temporally align the audio signals 142 and 146, similar to the encoder 120 described with reference to FIG. 1. Additionally, the encoder 402 may be configured to generate the encoded channels 180 and to transmit the encoded channels 180 (and additional information, such as the mismatch values 182 and the reference channel indicator 184) to the second device 160 via the network 152. In the example illustrated in FIG. 4, the encoder 402 does not adjust the target channel to reduce (or conceal) inter-frame discontinuities prior to generating the encoded channels 180.

The second device 160 includes a memory 410 and a decoder 420. The decoder 420 may include a comparator 422, a sample adjuster 426, and an output generator 430. The memory 410 may store the first mismatch value 112, the second mismatch value 114, first samples 412, and second samples 414. The second device 160 may be configured to receive the mismatch values 182 and to store the first mismatch value 112 and the second mismatch value 114 in the memory 410. The second device 160 may be configured to receive the encoded channels 180, and the decoder 420 may be configured to decode the encoded channels 180 to generate first samples 412 and second samples 414. For example, the decoder 420 may decode and up-mix the encoded channels 180 to generate the samples 412 and 414. In a particular implementation, the first samples 412 may correspond to the first audio signal 142 after decoding, and the second samples 414 may correspond to the second audio signal 146 after decoding. Alternatively, the first samples 412 may correspond to samples of the mid-channel, and the second samples 414 may correspond to samples of the side-channel.

The decoder 420 may be configured to adjust a target channel (e.g., the first samples 412 or the second samples 414) to compensate for (or conceal) an inter-frame discontinuity. To illustrate, the comparator 422 may be configured to determine a difference 424 between the first mismatch value 112 and the second mismatch value 114, similarly to the comparator 122 of FIG. 1. The difference 424 may indicate a change in mismatch values between the adjacent frames, which may result in an inter-frame discontinuity if the target channel is not adjusted.

The sample adjuster 426 may be configured to identify the target channel and to adjust samples of the target channel based on the difference 124. For example, the sample adjuster 426 may identify the first samples 412 or the second samples 414 as corresponding to the reference channel based on the reference channel indicator 184. When the reference channel indicator 184 has a first particular value (e.g., a value that indicates that the second audio signal 146 is the target channel), the sample adjuster 426 may identify the second samples 414 as corresponding to the target channel and identify the first samples 412 as corresponding to the reference channel. When the reference channel indicator 184 has a second particular value (e.g., a value that indicates that the first audio signal 142 is the target channel), the sample adjuster 426 may identify the first samples 412 as corresponding to the target channel and identify the second samples 414 as corresponding to the reference channel.

The sample adjuster 426 may be configured to adjust the samples corresponding to the target channel after identifying the target channel. For example, the sample adjuster 426 may identify the second samples 414 as corresponding to the target channel, and the sample adjuster 426 may adjust the second samples 414 to generate adjusted samples 428. To adjust the second samples 414, the sample adjuster 426 may be configured to interpolate a subset of the second samples 414 based on the difference 424 to generate estimated samples, and the sample adjuster 426 may be further configured to replace the subset of sample with the estimated samples to generate adjusted samples 428. When the difference 424 is negative, the sample adjuster 426 may interpolate at least one sample from a previous frame and samples of the subset of samples to avoid repetition of one or more samples, as described with reference to FIG. 3.

When the difference 424 is positive, the sample adjuster 426 may interpolate at least one sample of a previous frame and the subset of samples to avoid skipping one or more samples. Because of the time-shifting performed by the encoder 402, one or more samples may have been skipped and therefore omitted from the encoded channels 180, as described with reference to FIG. 2. The sample adjuster 426 may identify the number of samples skipped between frames based on the difference 424, and the sample adjuster 426 may interpolate the samples that are available after decoding to generate the estimated samples. Because one or more samples are not encoded by the encoder 402, in some implementations the interpolation performed by the decoder 420 may be less precise (e.g., have a coarser granularity) than the interpolation performed by the encoded 120 of FIG. 1.

In an alternate implementation, the encoder 402 may be configured to identify when one or more samples are skipped due to time-shifting the target channel. The encoder 402 may be configured to transmit the skipped one or more samples as additional samples 440 to the second device 160. The sample adjuster 426 may use the additional samples 440, as well as at least one sample of the previous frame and the subset of samples to generate the estimated samples. Estimated samples generated based on the additional samples 440 may have the same precision (e.g., the same granularity) as the estimated samples generated by the sample adjuster 126 of FIG. 1.

The output generator 430 may be configured to generate the first output channel 172 and the second output channel 176 based on the adjusted samples 428 and the first samples 412. For example, the output generator 430 may generate the first output channel 172 based on the first samples 412, and the output generator 430 may generate the second output channel 176 based on the second samples 414. The second device 160 may be configured to provide the output channels 172 and 176 to the speakers 170 and 174, respectively, for generating audio output.

During operation, the encoder 402 of the first device 102 time-shifts a target channel (e.g., one of the first audio signal 142 and the second audio signal 146) to temporally align the target channel with a reference channel (e.g., the other of the first audio signal 142 and the second audio signal 146). The encoder 402 generates the encoded signals 180 based on the reference channel and the time-shifted target channel, and the first device 102 transmits the encoded audio signals, the mismatch values 182, and the reference channel indicator 184 to the second device 160 via the network 152.

The second device 160 receives the encoded channels 180 and the decoder 420 decodes the encoded channels 180 to generate the first samples 412 and the second samples 414. In a particular implementation, the encoded channels 180 are stereo encoded and include a mid-channel and a side-channel. The comparator 422 determines the difference 424 between the first mismatch value 112 and the second mismatch value 114. The sample adjuster 426 identifies the samples (of the first samples 412 and the second samples 414) that correspond to the target channel based on the reference channel indicator 184, and the sample adjuster 426 adjusts the samples of the target channel based on the difference 424. For example, the sample adjuster 426 may interpolate (e.g., using sinc interpolation, Lagrange interpolation, a hybrid interpolation, or other interpolation) a subset of the second samples 414 (when the second samples 414 correspond to the target channel) to generate estimated samples, and the sample adjuster 426 may replace the subset of samples with the estimated samples to generate the adjusted samples 428. The output generate 430 may generate the first output channel 172 and the second output channel 176 based on the first samples 412 and the adjusted samples 428. Clicks or other audio sounds due to inter-frame discontinuities may be reduced (or eliminated) during playback of the output channels 172 and 176 due to the adjustment performed by the sample adjuster 426.

Thus, the system 400 of FIG. 4 enables a decoder to perform channel adjustment to compensate for (or conceal) inter-frame discontinuities caused by time-shifting a target channel. For example, the decoder 420 may decode the encoded channels 180 and the sample adjuster 426 of the decoder 420 may adjust a target channel (e.g., the second output channel 176) to spread out an inter-frame discontinuity over multiple samples. Spreading out the discontinuity may reduce (or eliminate) clicks or other audio sounds caused by the discontinuity, thereby enhancing a clarity of decoded output channels and enhancing a listener's experience.

Figure 5:
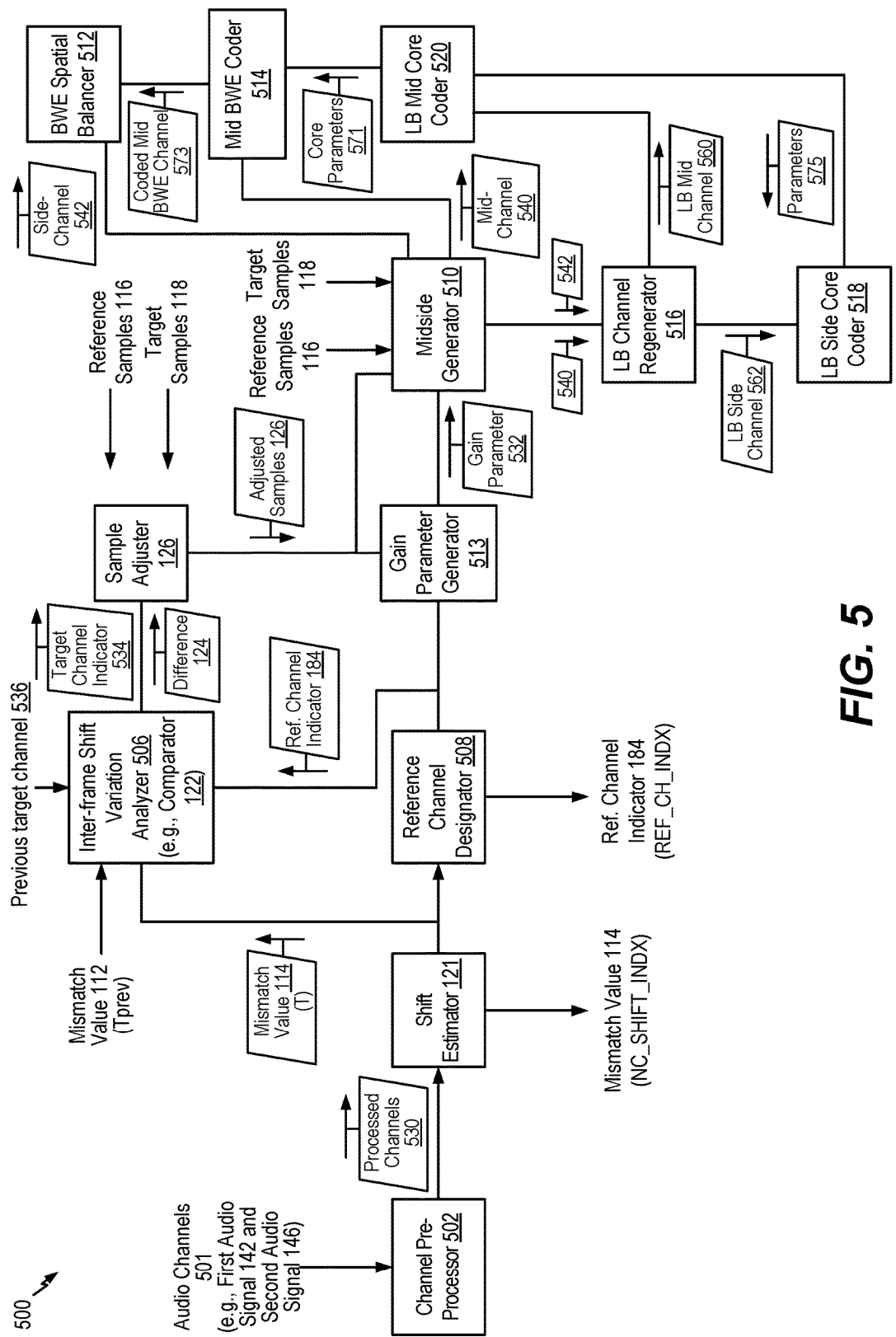
FIG. 5 is a diagram of a system configured to encode multiple channels using adjusted samples.

Referring to FIG. 5, a diagram of a system configured to encode multiple audio channels using adjusted samples is shown and generally designated 500. The system 500 may correspond to the system 100 of FIG. 1. For example, the system 100, the first device 102, the second device 160, or a combination thereof, may include one or more components of the system 500.

The system 500 includes a channel pre-processor 502 coupled, via the shift estimator 121, to an inter-frame shift variation analyzer 506, to a reference channel designator 508, or both. The channel pre-processor 502 may be configured to receive audio channels 501 (e.g., the reference channel 142 and the target channel 146 of FIG. 1) and to process the audio channels 501 to generate processed channels 530. For example, the channel pre-processor 502 may be configured to down-sample or resample the audio channels 501 to generate the processed channels 530. The shift estimator 121 may be configured to determine mismatch values (e.g., the first mismatch value 112 and the second mismatch value 114) based on comparison(s) of the processed channels 530. The inter-frame shift variation analyzer 506 may be configured to identify audio channels as reference channels and target channels. The inter-frame shift variation analyzer 506 may also be configured to determine a difference (e.g., the difference 124 of FIG. 1) between two mismatch values (e.g., the first mismatch value 112 and the second mismatch value 114). The reference channel designator 508 may be configured to select one audio channel as a reference channel (e.g., a channel that is not time-shifted) and to select another audio channel as a target channel (e.g., a channel that is time-shifted relative to the reference channel to temporally align the channel with the reference channel).

The inter-frame shift variation analyzer 506 may be coupled, via the sample adjuster 126, to the gain parameter generator 513. As described with reference to FIG. 1, the sample adjuster 126 may be configured to adjust a target channel based on a difference between mismatch values. For example, the sample adjuster 126 may be configured to perform interpolation on a subset of samples to generate estimated samples that are used to generate adjusted samples of the target channel. The gain parameter generator 513 may be configured to determine a gain parameter of the reference channel that "normalizes" (e.g., equalizes) a power level of the reference channel relative to a power level of the target channel. Alternatively, the gain parameter generator 513 may be configured to determine a gain parameter of the target channel that normalizes (e.g., equalizes) a power level of the target channel relative to a power level of the reference channel.

The reference channel designator 508 may be coupled to the inter-frame shift variation analyzer 506, to the gain parameter generator 513, or both. The sample adjuster 126 may be coupled to a midside generator 510, to the gain parameter generator 513, or to both. The gain parameter generator 513 may be coupled to the midside generator 510. The midside generator 510 may be configured to perform encoding on the reference channel and the adjusted target channel to generate at least one encoded channel. For example, the midside generator 510 may be configured to perform stereo encoding to generate a mid-channel 540 and a side-channel 542. In a particular implementation, the midside generator 510 may include or correspond to the channel generator 130 of FIG. 1.

The midside generator 510 may be coupled to a bandwidth extension (BWE) spatial balancer 512, a mid BWE coder 514, a low band (LB) channel regenerator 516, or a combination thereof. The LB channel regenerator 516 may be coupled to a LB side core coder 518, a LB mid core coder 520, or both. The mid BWE coder 514 may be coupled to the BWE spatial balancer 512, the LB mid core coder 520, or both. The BWE spatial balancer 512, the mid BWE coder 514, the LB channel regenerator 516, the LB side core coder 518, and the LB mid core coder 520 may be configured to perform bandwidth extension and additional coding, such as low band coding and mid band coding, on the mid-channel 540, the side-channel 542, or both. Performing bandwidth extension and additional coding may include performing additional channel encoding, generating parameters, or both.

During operation, the channel pre-processor 502 may receive the audio channels 501. For example, the channel pre-processor 502 may receive the audio channels 501 from the one or more interfaces 104 of FIG. 1. The audio channels 501 may include the first audio signal 142, the second audio signal 146, or both. In a particular implementation, the audio channels 501 may include a left channel and a right channel. In other implementations, the audio channels 501 may include other channels. The channel pre-processor 502 may down-sample (or resample) the first audio signal 142 and the second audio signal 146 to generate the processed channels 530 (e.g., the downsampled first audio signal 142 and the downsampled second audio signal 146). The channel pre-processor 502 may provide the processed channels 530 to the shift estimator 121.

The shift estimator 121 may generate mismatch values based on the processed channels 530. For example, the shift estimator 121 may generate the second mismatch value 114 based on a comparison of the processed channels 530 (e.g., a comparison of the third frame of the downsampled first audio signal 142 to the fourth frame of the downsampled second audio signal 146). In some implementations, the shift estimator 121 may generate tentative mismatch values, interpolated mismatch values, and "final" mismatch values, as described with reference to FIG. 1, and the first mismatch value 112 and the second mismatch value 114 may correspond to final mismatch values. The shift estimator 121 may provide the second mismatch value 114 (and other mismatch values) to the inter-frame shift variation analyzer 506 and to the reference channel designator 508. In a particular implementation, the second mismatch value 114 may be provided as a non-causal mismatch value (NC_SHIFT_INDX) after performance of an absolute value operation (e.g., the non-causal mismatch value may be an unsigned version of the second mismatch value 114). The non-causal mismatch value may be transmitted to other devices, as described with reference to FIG. 1.

In a particular implementation, the shift estimator 121 may prevent a next mismatch value from having a different sign (e.g., positive or negative) than a current mismatch value. For example, when the mismatch value for a first frame is negative and the mismatch value for a second frame is determined to be positive, the shift estimator 121 may set the mismatch value for the second frame to be zero. As another example, when the mismatch value for the first frame is positive and the mismatch value for the second frame is determined to be negative, the shift estimator 121 may set the mismatch value for the second frame to be zero. Thus, in this implementation, a mismatch value for a current frame has the same sign (e.g., positive or negative) as a mismatch value for a previous frame, or the mismatch value for the current frame is zero.

The reference channel designator 508 may select one of the first audio signal 142 and the second audio signal 146 as a reference channel for a time period corresponding to the third frame and the fourth frame. The reference channel designator 508 may determine the reference channel based on the second mismatch value 114. For example, when the second mismatch value 114 is negative, the reference channel designator 508 may identify the second audio signal 146 as the reference channel and the first audio signal 142 as the target channel. When the second mismatch value 114 is positive or zero, the reference channel designator 508 may identify the second audio signal 146 as the target channel and the first audio signal 142 as the reference channel. The reference channel designator 508 may generate the reference channel indicator 184 that has a value that indicates the reference channel. For example, the reference channel indicator 184 may have a first value (e.g., a logical zero value) when the first audio signal 142 is identified as the reference channel, and the reference channel indicator 184 may have a second value (e.g., a logical one value) when the second audio signal 146 is identified as the reference channel. The reference channel designator 508 may provide the reference channel indicator 184 to the inter-frame shift variation analyzer 506 and to the gain parameter generator 513. Additionally, the reference channel indicator 184 (REF_CH_INDX) may be transmitted to other devices, as described with reference to FIG. 1. In other implementations, a target channel designator (not shown) may generate target channel indicator that has a value that indicates the target channel.

The inter-frame shift variation analyzer 506 may determine the difference 124 between the first mismatch value 112 and the second mismatch value 114. To illustrate, the inter-frame shift variation analyzer 506 may receive the second mismatch value 114 from the shift estimator 121 after the second mismatch value 114 is determined (e.g., generated), and the inter-frame shift variation analyzer 506 may access previous mismatch values (e.g., in a buffer or other storage) to retrieve the previous mismatch value (e.g., the first mismatch value 112). The inter-frame shift variation analyzer 506 may determine the difference 124 between the first mismatch value 112 and the second mismatch value 114. In a particular implementation, the inter-frame shift variation analyzer 506 includes the comparator 122 that determines the difference 124).

Additionally, the inter-frame shift variation analyzer 506 may identify an adjusted target channel based on the reference channel indicator 184, the first mismatch value 112 (Tprev), the second mismatch value 114 (T), and a previous target channel 536 (e.g., a previous adjusted target channel). To illustrate, the inter-frame shift variation analyzer 506 may determine the adjusted target channel according to the following table:

TABLE 1

| Previous Shift (TPrev) | Current Shift (T) | Previous Coded Target Channel | Adjusted Target Channel (of Current Frame) | Coded Target Channel (of Current Frame) |
|---|---|---|---|---|
| NEG | NEG | CHAN_1 | CHAN_1 | CHAN_1 |
| NEG | ZERO | CHAN_1 | CHAN_1 | CHAN_2 |
| ZERO | NEG | CHAN_2 | CHAN_1 | CHAN_1 |
| POS | ZERO | CHAN_2 | CHAN_2 | CHAN_2 |

TABLE 1-continued

| Previous Shift (TPrev) | Current Shift (T) | Previous Coded Target Channel | Adjusted Target Channel (of Current Frame) | Coded Target Channel (of Current Frame) |
|---|---|---|---|---|
| POS | POS | CHAN_2 | CHAN_2 | CHAN_2 |
| ZERO | POS | CHAN_2 | CHAN_2 | CHAN_2 |

In Table 1, the previous shift (Tprev) corresponds to the first mismatch value 112, the current shift (T) corresponds to the second mismatch value 114, and the previous coded target channel corresponds to the previous target channel 536. The coded target channel indicates an audio channel that is used for mid channel and side-channel generation. The coded target channel may not be the same as the adjusted target channel (e.g., the audio channel that is time shifted and adjusted to smooth out inter-frame discontinuities). The adjusted target channel indicates the audio channel that is to be adjusted by the sample adjuster 126.

As indicated by Table 1, the first audio signal 142 ("CHAN_1") is the adjusted target channel and the coded target channel when the first mismatch value 112 (Tprev) is negative, the second mismatch value 114 (T) is negative, and the previous coded target channel is the first audio signal 142. The first audio signal 142 is also the adjusted target channel and the coded target channel when the first mismatch value 112 is zero, the second mismatch value 114 is negative, and the previous coded target channel is the second audio signal 146. The second audio signal 146 is the adjusted target channel and the coded target channel when the first mismatch value 112 is positive, the second mismatch value 114 is zero, and the previous coded target channel is the second audio signal 146. The second audio signal 146 is also the adjusted target channel and the coded target channel when the first mismatch value 112 is positive, the second mismatch value 114 is positive, and the previous coded target channel is the second audio signal 146. The second audio signal 146 is also the adjusted target channel and the coded target channel when the first mismatch value 112 is zero, the second mismatch value 114 is positive, and the previous coded target channel is the second audio signal 146. The first audio signal 142 is the adjusted target channel and the second audio signal 146 is the coded target channel when the first mismatch value 112 is negative, the second mismatch value 114 is zero, and the previous coded target channel is the first audio signal 142. In this instance, the first audio signal 142 is to be adjusted by the sample adjuster 126 and the second audio signal 146 is used to code mid channel and side-channels.

Figure 6:
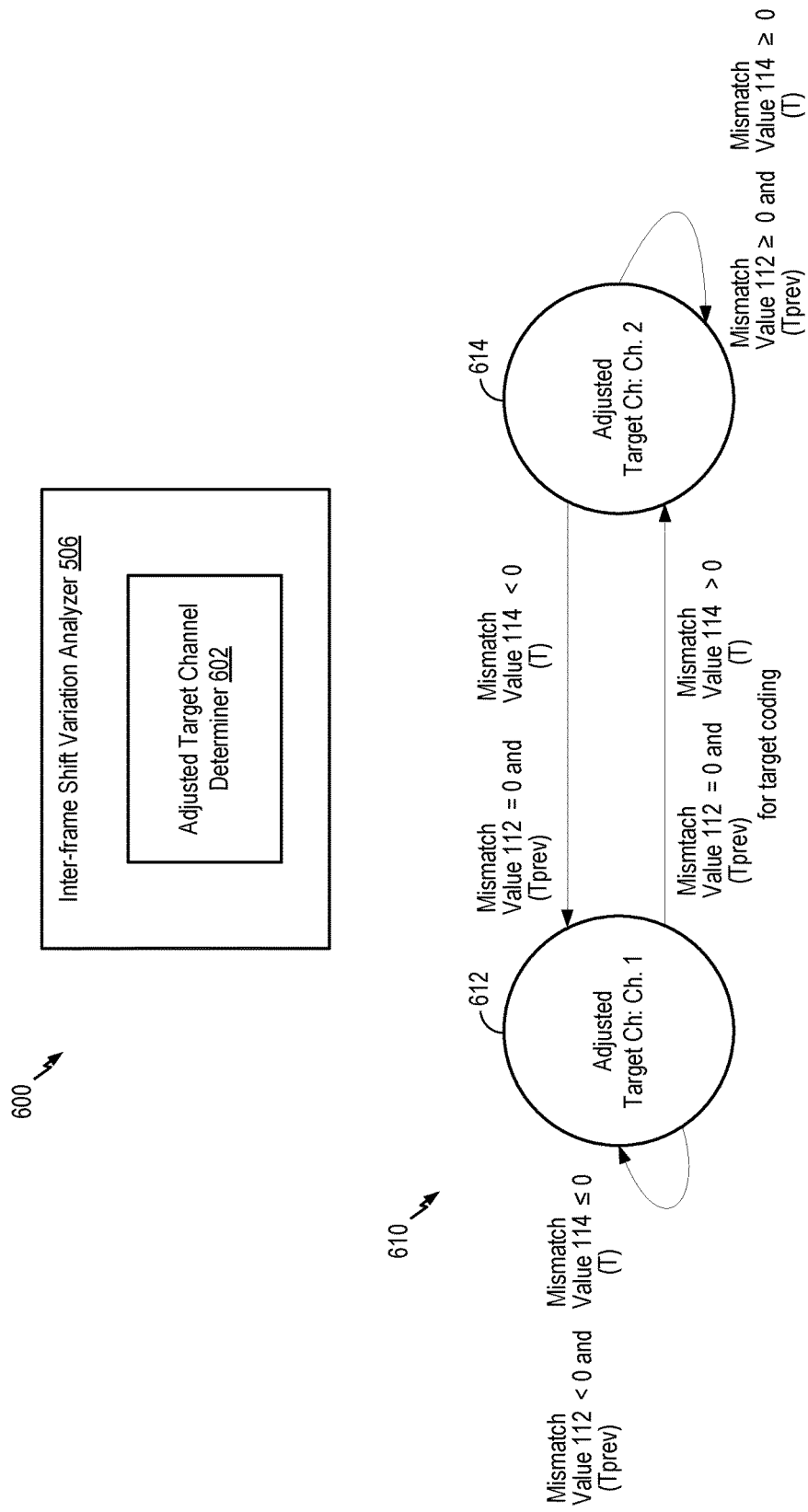
FIG. 6 is a diagram of an example of a state machine to determine a reference channel.

Operation of the inter-frame shift variation analyzer 506 to determine the adjusted target channel is illustrated by FIG. 6. FIG. 6 shows a diagram 600 of a particular implementation of the inter-frame shift variation analyzer 506. The inter-frame shift variation analyzer 506 may include an adjusted target channel determiner 602. The adjusted target channel determiner 602 may determine the adjusted target channel in accordance with the state diagram 610. After determining the adjusted target channel, the inter-frame shift variation analyzer 506 may set a value of a target channel indicator 534 to identify (e.g., indicate) the adjusted target channel.

The state diagram 610 includes setting the target channel indicator 534 and the reference channel indicator 184 to indicate the first audio signal 142, at state 612. The state diagram 610 includes setting the target channel indicator 534 and the reference channel indicator 184 to indicate the second audio signal 146, at state 614. If the first mismatch value 112 has a value that is greater than or equal to zero and the second mismatch value 114 has a value that is greater than or equal to zero, the inter-frame shift variation analyzer 506 may remain in state 614. The inter-frame shift variation analyzer 506 may, in response to determining that the first mismatch value 112 is zero and that the second mismatch value 114 has a negative value, transition from the state 614 to the state 612. For example, the inter-frame shift variation analyzer 506 may, in response to determining that the first mismatch value 112 is zero and that the second mismatch value 114 has a negative value, change the target channel indicator 534 from indicating that the second audio signal 146 is the target channel to indicating that the first audio signal 142 is the target audio signal. If the first mismatch value 112 is negative and the second mismatch value 114 is less than or equal to zero, the inter-frame shift variation analyzer 506 may remain in state 612. The inter-frame shift variation analyzer 506 may, in response to determining that the first mismatch value 112 has is zero and that the second mismatch value 114 has a positive value, transition from the state 612 to the state 614. For example, the inter-frame shift variation analyzer 506 may, in response to determining that the first mismatch value 112 is zero and that the second mismatch value 114 is has a positive value, may change the target channel indicator 534 from indicating that the first audio signal 142 is the target channel to indicating that the second audio signal 146 is the target channel.

Returning to FIG. 5, after determining the adjusted target channel, the inter-frame shift variation analyzer 506 generates the target channel indicator 534 that indicates the adjusted target channel. For example, a first value (e.g., a logical zero value) of the target channel indicator 534 may indicate that the first audio signal 142 is the adjusted target channel, and a second value (e.g., a logical one value) of the target channel indicator 534 may indicate that the second audio signal 146 is the adjusted target channel. The inter-frame shift variation analyzer 506 may provide the target channel indicator 534 and the difference 124 to the sample adjuster 126.

The sample adjuster 126 may adjust samples corresponding to the adjusted target channel based on the difference 124 to generate the adjusted samples 128. The sample adjuster 126 may identify whether the first samples 116 or the second samples 118 correspond to the adjusted target channel based on the target channel indicator 534. Adjusting the target channel may include performing an interpolation on a subset of samples of the target channel to generate estimated samples, and replacing the subset of samples with the estimated samples to generate the adjusted samples 128, as described with reference to FIGS. 1-3. For example, the sample adjuster 126 may interpolate a subset of samples of the target channel that correspond to frame boundaries that are repeated or skipped through smoothing and slow-shifting to generate the adjusted samples 128. The smoothing and slow-shifting may be performed based on sinc interpolators, Lagrange interpolators, hybrid interpolators, or a combination thereof. If the difference 124 is zero, the adjusted samples 128 may be the same as the samples of the target channel. The sample adjuster 126 may provide the adjusted samples 128 to the gain parameter generator 513 and the midside generator 510.

The gain parameter generator 513 may generate a gain parameter 532 based on the reference channel indicator 184 and the adjusted samples 128. The gain parameter 532 may normalize (e.g., equalize) a power level of the target channel relative to a power level of the reference channel. Alternatively, the gain parameter generator 513 may receive the reference channel (or samples thereof) and determine the gain parameter 532 that normalizes a power level of the reference channel relative to a power level of the target channel. In some implementations, the gain parameter 532 may be determined based on formulas 3a-3f. The gain parameter generator 513 may provide the gain parameter 532 to the midside generator 510.

The midside generator 510 may generate the mid-channel 540, the side-channel 542, or both, based on the adjusted samples 128, the first samples 116, the second samples 118, and the gain parameter 532. For example, the midside generator 510 may generate the mid-channel 540 based on Equation 1a or Equation 1b, and the midside generator 510 may generate the side-channel 542 based on Equation 2a or Equation 2b, as described with reference to FIG. 1. The midside generator 510 may use the samples (of the first samples 116) that correspond to the reference channel in generating the mid-channel 540 and the side-channel 542.

The midside generator 510 may provide the side-channel 542 to the BWE spatial balancer 512, the LB channel regenerator 516, or both. The midside generator 510 may provide the mid-channel 540 to the mid BWE coder 514, the LB channel regenerator 516, or both. The LB channel regenerator 516 may generate a LB mid channel 560 based on the mid-channel 540. For example, the LB channel regenerator 516 may generate the LB mid channel 560 by filtering the mid-channel 540. The LB channel regenerator 516 may provide the LB mid channel 560 to the LB mid core coder 520. The LB mid core coder 520 may generate parameters (e.g., core parameters 571, parameters 575, or both) based on the LB mid channel 560. The core parameters 571, the parameters 575, or both, may include an excitation parameter, a voicing parameter, etc. The LB mid core coder 520 may provide the core parameters 571 to the mid BWE coder 514, the parameters 575 to the LB side core coder 518, or both. The core parameters 571 may be the same as or distinct from the parameters 575. For example, the core parameters 571 may include one or more of the parameters 575, may exclude one or more of the parameters 575, may include one or more additional parameters, or a combination thereof. The mid BWE coder 514 may generate a coded mid BWE channel 573 based on the mid-channel 540, the core parameters 571, or a combination thereof. The mid BWE coder 514 may provide the coded mid BWE channel 573 to the BWE spatial balancer 512.

The LB channel regenerator 516 may generate a LB side channel 562 based on the side-channel 542. For example, the LB channel regenerator 516 may generate the LB side channel 562 by filtering the side-channel 542. The LB channel regenerator 516 may provide the LB side channel 562 to the LB side core coder 518.

Thus, the system 500 of FIG. 5 generates encoded channels (e.g., the mid-channel 540 and the side-channel 542) that are based on an adjusted target channel. Adjusting the target channel based on a difference between mismatch values may compensate for (or conceal) inter-frame discontinuities, which may reduce clicks or other audio sounds during playback of the encoded channels.

Figure 7:
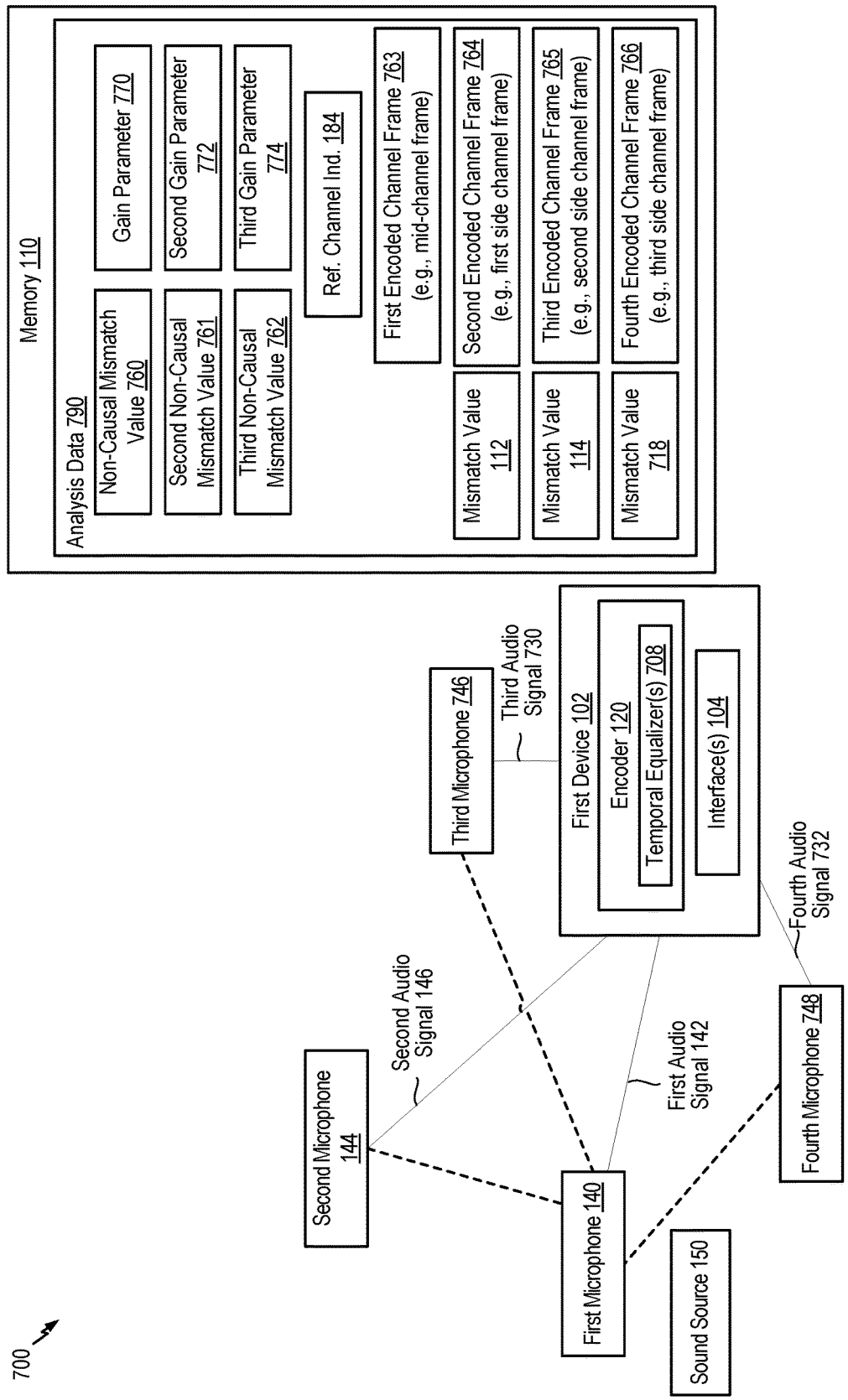
FIG. 7 is a diagram illustrating an example of a system that includes the device of FIG. 1.

Referring to FIG. 7, an illustrative example of a system is shown and generally designated 700. The system 700 may correspond to the system 100 of FIG. 1. For example, the system 100, the first device 102 of FIG. 1, or both, may include one or more components of the system 700. In FIG. 7, the first device 102 is coupled to the first microphone 140, the second microphone 144, a third microphone 746, and a fourth microphone 748.

During operation, the first device 102 may receive the first audio signal 142 via the first microphone 140, the second audio signal 146 via the second microphone 74, a third audio signal 730 via the third microphone 746, a fourth audio signal 732 via the fourth microphone 748, or a combination thereof. The sound source 150 may be closer to one of the first microphone 140, the second microphone 144, the third microphone 746, or the fourth microphone 748 than to the remaining microphones. For example, the sound source 150 may be closer to the first microphone 140 than to each of the second microphone 144, the third microphone 746, and the fourth microphone 748.

The encoder 120 may determine the first mismatch value 112 (e.g., a final mismatch value), as described with reference to FIG. 1, indicative of a shift of a particular audio signal of the first audio signal 142, the second audio signal 146, the third audio signal 730, or fourth audio signal 732 relative to each of the remaining audio signals. For example, the encoder 120 may determine the first mismatch value 112 indicative of a shift of the second audio signal 146 relative to the first audio signal 142, the second mismatch value 114 (e.g., a second final mismatch value) indicative of a shift of the third audio signal 730 relative to the first audio signal 142, a third mismatch value 718 (e.g., a third final mismatch value) indicative of a shift of the fourth audio signal 732 relative to the first audio signal 142, or a combination thereof. In some implementations, the encoder 120 may include temporal equalizer(s) 708 that are configured to perform the operations of the encoder 120 as described with reference to FIG. 1. For example, the temporal equalizer(s) 708 may include the shift estimator 121, the comparator 122, the sample adjuster 126, and the signal generator 130 of FIG. 1, one or more components of the system 500, or a combination thereof.

The temporal equalizer(s) 708 may select one of the first audio signal 142, the second audio signal 146, the third audio signal 730, or the fourth audio signal 732 as a reference channel based on the first mismatch value 112, the second mismatch value 114, and the third mismatch value 718. For example, the temporal equalizer(s) 708 may select the particular signal (e.g., the first audio signal 142) as a reference channel in response to determining that each of the first mismatch value 112, the second mismatch value 114, and the third mismatch value 718 has a first value (e.g., a non-negative value) indicating that the corresponding audio signal is delayed in time relative to the particular audio signal or that there is no time delay between the corresponding audio signal and the particular audio signal. To illustrate, a positive value of a mismatch value (e.g., the first mismatch value 112, the second mismatch value 114, or the third mismatch value 718) may indicate that a corresponding signal (e.g., the second audio signal 146, the third audio signal 730, or the fourth audio signal 732) is delayed in time relative to the first audio signal 142. A zero value of a mismatch value (e.g., the first mismatch value 112, the second mismatch value 114, or the third mismatch value 718) may indicate that there is no time delay (or an insubstantial time delay) between a corresponding signal (e.g., the second audio signal 146, the third audio signal 730, or the fourth audio signal 732) and the first audio signal 142.

The temporal equalizer(s) 708 may generate the reference channel indicator 184 to indicate that the first audio signal 142 corresponds to the reference channel. The temporal equalizer(s) 708 may determine that the second audio signal 146, the third audio signal 730, and the fourth audio signal 732 correspond to target channels.

Alternatively, the temporal equalizer(s) 708 may determine that at least one of the first mismatch value 112, the second mismatch value 114, or the third mismatch value 718 has a second value (e.g., a negative value) indicating that the particular audio signal (e.g., the first audio signal 142) is delayed with respect to another audio signal (e.g., the second audio signal 146, the third audio signal 730, or the fourth audio signal 732).

The temporal equalizer(s) 708 may select a first subset of mismatch values from the first mismatch value 112, the second mismatch value 114, and the third mismatch value 718. Each mismatch value of the first subset may have a value (e.g., a negative value) indicating that the first audio signal 142 is delayed in time relative to a corresponding audio signal. For example, the second mismatch value 114 (e.g., −12) may indicate that the first audio signal 142 is delayed in time relative to the third audio signal 730. The third mismatch value 718 (e.g., −14) may indicate that the first audio signal 142 is delayed in time relative to the fourth audio signal 732. The first subset of mismatch values may include the second mismatch value 114 and third mismatch value 718.

The temporal equalizer(s) 708 may select a particular mismatch value (e.g., a lower mismatch value) of the first subset that indicates a higher delay of the first audio signal 142 to a corresponding audio signal. The second mismatch value 114 may indicate a first delay of the first audio signal 142 relative to the third audio signal 730. The third mismatch value 718 may indicate a second delay of the first audio signal 142 relative to the fourth audio signal 732. The temporal equalizer(s) 708 may select the third mismatch value 718 from the first subset of mismatch values in response to determining that the second delay is longer than the first delay.

The temporal equalizer(s) 708 may select an audio signal corresponding to the particular mismatch value as a reference channel. For example, the temporal equalizer(s) 708 may select the fourth audio signal 732 corresponding to the third mismatch value 718 as the reference channel. The temporal equalizer(s) 708 may generate the reference channel indicator 184 to indicate that the fourth audio signal 732 corresponds to the reference channel. The temporal equalizer(s) 708 may determine that the first audio signal 142, the second audio signal 146, and the third audio signal 730 correspond to target channels.

The temporal equalizer(s) 708 may update the first mismatch value 112 and the second mismatch value 114 based on the particular mismatch value corresponding to the reference channel. For example, the temporal equalizer(s) 708 may update the first mismatch value 112 based on the third mismatch value 718 to indicate a first particular delay of the fourth audio signal 732 relative to the second audio signal 146 (e.g., the first mismatch value 112=the first mismatch value 112−the third mismatch value 718). To illustrate, the first mismatch value 112 (e.g., 2) may indicate a delay of the first audio signal 142 relative to the second audio signal 146. The third mismatch value 718 (e.g., −14) may indicate a delay of the first audio signal 142 relative to the fourth audio signal 732. A first difference (e.g., 16=2−(−14)) between the first mismatch value 112 and the third mismatch value 718 may indicate a delay of the fourth audio signal 732 relative to the second audio signal 146. The temporal equalizer(s) 708 may update the first mismatch value 112 based on the first difference. The temporal equalizer(s) 708 may update the second mismatch value 114 (e.g., 2) based on the third mismatch value 718 to indicate a second particular delay of the fourth audio signal 732 relative to the third audio signal 730 (e.g., the second mismatch value 114=the second mismatch value 114−the third mismatch value 718). To illustrate, the second mismatch value 114 (e.g., −12) may indicate a delay of the first audio signal 142 relative to the third audio signal 730. The third mismatch value 718 (e.g., −14) may indicate a delay of the first audio signal 142 relative to the fourth audio signal 732. A second difference (e.g., 2=−12−(−14)) between the second mismatch value 114 and the third mismatch value 718 may indicate a delay of the fourth audio signal 732 relative to the third audio signal 730. The temporal equalizer(s) 708 may update the second mismatch value 114 based on the second difference.

The temporal equalizer(s) 708 may reverse the third mismatch value 718 to indicate a delay of the fourth audio signal 732 relative to the first audio signal 142. For example, the temporal equalizer(s) 708 may update the third mismatch value 718 from a first value (e.g., −14) indicating a delay of the first audio signal 142 relative to the fourth audio signal 732 to a second value (e.g., +14) indicating a delay of the fourth audio signal 732 relative to the first audio signal 142 (e.g., the third mismatch value 718=−the third mismatch value 718).

The temporal equalizer(s) 708 may generate a non-causal mismatch value 760 by applying an absolute value function to the first mismatch value 112. The temporal equalizer(s) 708 may generate a second non-causal mismatch value 761 by applying an absolute value function to the second mismatch value 114. The temporal equalizer(s) 708 may generate a third non-causal mismatch value 762 by applying an absolute value function to the third mismatch value 718.

The temporal equalizer(s) 708 may generate a gain parameter of each target channel based on the reference channel, as described with reference to FIG. 1. In an example where the first audio signal 142 corresponds to the reference channel, the temporal equalizer(s) 708 may generate a gain parameter 770 of the second audio signal 146 based on the first audio signal 142, a second gain parameter 772 of the third audio signal 730 based on the first audio signal 142, a third gain parameter 774 of the fourth audio signal 732 based on the first audio signal 142, or a combination thereof.

The temporal equalizer(s) 708 may generate an encoded signal (e.g., a mid channel signal frame) based on the first audio signal 142, the second audio signal 146, the third audio signal 730, and the fourth audio signal 732. For example, the encoded signal (e.g., a first encoded signal frame 763) may correspond to a sum of samples of reference channel (e.g., the first audio signal 142) and samples of the target channels (e.g., the second audio signal 146, the third audio signal 730, and the fourth audio signal 732). The samples of each of the target channels may be time-shifted relative to the samples of the reference channel based on a corresponding mismatch value, as described with reference to FIG. 1. The temporal equalizer(s) 708 may determine a first product of the gain parameter 770 and samples of the second audio signal 146, a second product of the second gain parameter 772 and samples of the third audio signal 730, and a third product of the third gain parameter 774 and samples of the fourth audio signal 732. The first encoded signal frame 763 may correspond to a sum of samples of the first audio signal 142, the first product, the second product, and the third product. That is, the first encoded signal frame 763 may be generated based on the following Equations:

$$M = \text{Ref}(n) + g_{D1}\text{Targ1}(n+N_1) + g_{D2}\text{Targ2}(n+N_2) + g_{D3}\text{Targ3}(n+N_3), \quad \text{Equation 5a}$$

$$M = \text{Ref}(n) + \text{Targ1}(n+N_1) + \text{Targ2}(n+N_2) + \text{Targ3}(n+N_3), \quad \text{Equation 5b}$$

where M corresponds to a mid channel frame (e.g., the first encoded signal frame 763), Ref (n) corresponds to samples of a reference channel (e.g., the first audio signal 142), $g_{D1}$ corresponds to the gain parameter 770, $g_{D2}$ corresponds to the second gain parameter 772, $g_{D3}$ corresponds to the third gain parameter 774, $N_1$ corresponds to the non-causal mismatch value 760, $N_2$ corresponds to the second non-causal mismatch value 761, $N_3$ corresponds to the third non-causal mismatch value 762, Targ1(n+N$_1$) corresponds to samples of a first target channel (e.g., the second audio signal 146), Targ2(n+N$_2$) corresponds to samples of a second target channel (e.g., the third audio signal 730), and Targ3(n+N$_3$) corresponds to samples of a third target channel (e.g., the fourth audio signal 732). Each of the target channels (e.g., Targ1, Targ2, Targ3) are adjusted to compensate for temporal discontinuities based on the inter-offset difference with respect to the reference channel in the current frame. Based on the inter-frame changes in the temporal offsets estimated and the designated reference and target channels, a state machine logic as shown in FIG. 6 is extended to multichannel case to decide which of the subset of input channels in the current frame are temporally adjusted.

The temporal equalizer(s) 708 may generate an encoded signal (e.g., a side channel signal frame) corresponding to each of the target channels. For example, the temporal equalizer(s) 708 may generate a second encoded signal frame 764 based on the first audio signal 142 and the second audio signal 146. For example, the second encoded signal frame 764 may correspond to a difference of samples of the first audio signal 142 and samples of the second audio signal 146. Similarly, the temporal equalizer(s) 708 may generate a third encoded signal frame 765 (e.g., a side channel frame) based on the first audio signal 142 and the third audio signal 730. For example, the third encoded signal frame 765 may correspond to a difference of samples of the first audio signal 142 and samples of the third audio signal 730. The temporal equalizer(s) 708 may generate a fourth encoded signal frame 766 (e.g., a side channel frame) based on the first audio signal 142 and the fourth audio signal 732. For example, the fourth encoded signal frame 766 may correspond to a difference of samples of the first audio signal 142 and samples of the fourth audio signal 732. The second encoded signal frame 764, the third encoded signal frame 765, and the fourth encoded signal frame 766 may be generated based on one of the following Equations:

$$S_P = \text{Ref}(n) - g_{DP}\text{Targ}P(n+N_P), \quad \text{Equation 6a}$$

$$S_P = g_{DP}\text{Ref}(n) - \text{Targ}P(n+N_P), \quad \text{Equation 6b}$$

where $S_P$ corresponds to a side channel frame, Ref(n) corresponds to samples of a reference channel (e.g., the first audio signal 142), $g_{DP}$ corresponds to a gain parameter corresponding to an associated target channel, $N_P$ corresponds to a non-causal mismatch value corresponding to the associated target channel, and TargP(n+N$_P$) corresponds to samples of the associated target channel. For example, $S_P$ may correspond to the second encoded signal frame 764, $g_{DP}$ may correspond to the gain parameter 770, $N_P$ may corresponds to the non-causal mismatch value 760, and TargP(n+N$_P$) may correspond to samples of the second audio signal 146. As another example, $S_P$ may correspond to the third encoded signal frame 765, $g_{DP}$ may correspond to the second gain parameter 772, $N_P$ may corresponds to the second non-causal mismatch value 761, and TargP(n+N$_P$) may correspond to samples of the third audio signal 730. As a further example, $S_P$ may correspond to the fourth encoded signal frame 766, $g_{DP}$ may correspond to the third gain parameter 774, $N_P$ may corresponds to the third non-causal mismatch value 762, and TargP(n+N$_P$) may correspond to samples of the fourth audio signal 732.

The temporal equalizer(s) 708 may store the second mismatch value 114, the third mismatch value 718, the second non-causal mismatch value 761, the third non-causal mismatch value 762, the second gain parameter 772, the third gain parameter 774, the first encoded signal frame 763, the second encoded signal frame 764, the third encoded signal frame 765, the fourth encoded signal frame 766, or a combination thereof, in the memory 110. For example, analysis data 790 may include the second mismatch value 114, the third mismatch value 718, the second non-causal mismatch value 761, the third non-causal mismatch value 762, the second gain parameter 772, the third gain parameter 774, the first encoded signal frame 763, the third encoded signal frame 765, the fourth encoded signal frame 766, or a combination thereof.

The one or more interfaces 104 may transmit, to another device (e.g., the second device 160 of FIG. 1), the first encoded signal frame 763, the second encoded signal frame 764, the third encoded signal frame 765, the fourth encoded signal frame 766, the gain parameter 770, the second gain parameter 772, the third gain parameter 774, the reference channel indicator 184, the non-causal mismatch value 760, the second non-causal mismatch value 761, the third non-causal mismatch value 762, or a combination thereof. The first encoded signal frame 763, the second encoded signal frame 764, the third encoded signal frame 765, the fourth encoded signal frame 766, or a combination thereof, may correspond to the encoded signals 180 of FIG. 1. The first mismatch value 112, the second mismatch value 114, the third mismatch value 718, the non-causal mismatch value 760, the second non-causal mismatch value 761, the third non-causal mismatch value 762, or a combination thereof, may correspond to the mismatch values 182 of FIG. 1.

Figure 8:
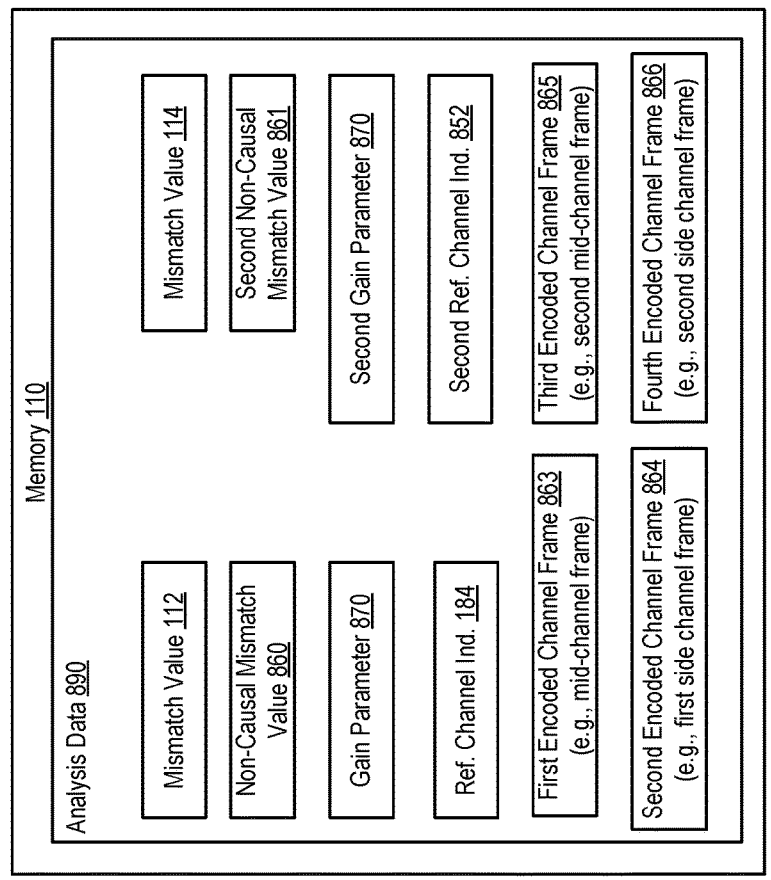
FIG. 8 is a diagram illustrating another example of a system that includes the device of FIG. 1.
Figure 8:
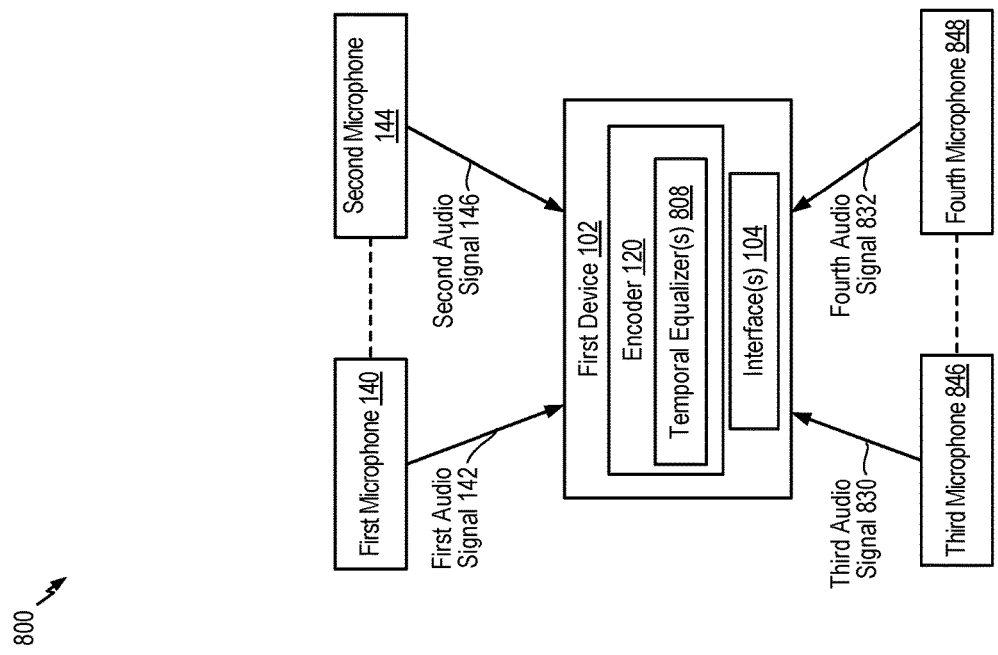

Referring to FIG. 8, an illustrative example of a system is shown and generally designated 800. The system 800 differs from the system 700 of FIG. 7 in that the temporal equalizer(s) 808 may be configured to determine multiple reference channels, as described herein.

During operation, the temporal equalizer(s) 808 may receive the first audio signal 142 via the first microphone 140, the second audio signal 146 via the second microphone 144, a third audio signal 830 via a third microphone 846, a fourth audio signal 832 via a fourth microphone 848, or a combination thereof. The temporal equalizer(s) 808 may determine the first mismatch value 112, a non-causal mismatch value 860, a gain parameter 870, the reference channel indicator 184, a first encoded signal frame 863 (e.g., a mid channel signal frame), a second encoded signal frame 864 (e.g., a side channel signal frame), or a combination thereof, based on the first audio signal 142 and the second audio signal 146, as described with reference to FIGS. 1 and 5. Similarly, the temporal equalizer(s) 808 may determine the second mismatch value 114, a second non-causal mismatch value 861, a second gain parameter 872, a second reference channel indicator 852, a third encoded signal frame 865 (e.g., a mid channel signal frame), a fourth encoded signal frame 866 (e.g., a side channel signal frame), or a combination thereof, based on the third audio signal 830 and the fourth audio signal 832.

The one or more interfaces 104 may transmit the first encoded signal frame 863, the second encoded signal frame 864, the third encoded signal frame 865, the fourth encoded signal frame 866, the gain parameter 870, the second gain parameter 872, the non-causal mismatch value 860, the second non-causal mismatch value 861, the reference channel indicator 184, the second reference channel indicator 852, or a combination thereof. The first encoded signal frame 863, the second encoded signal frame 864, the third encoded signal frame 865, the fourth encoded signal frame 866, or a combination thereof, may correspond to the encoded signals 180 of FIG. 1. The first mismatch value 112, the second mismatch value 114, the non-causal mismatch value 860, the second non-causal mismatch value 861, or a combination thereof, may correspond to the mismatch values 182 of FIG. 1.

Figure 9:
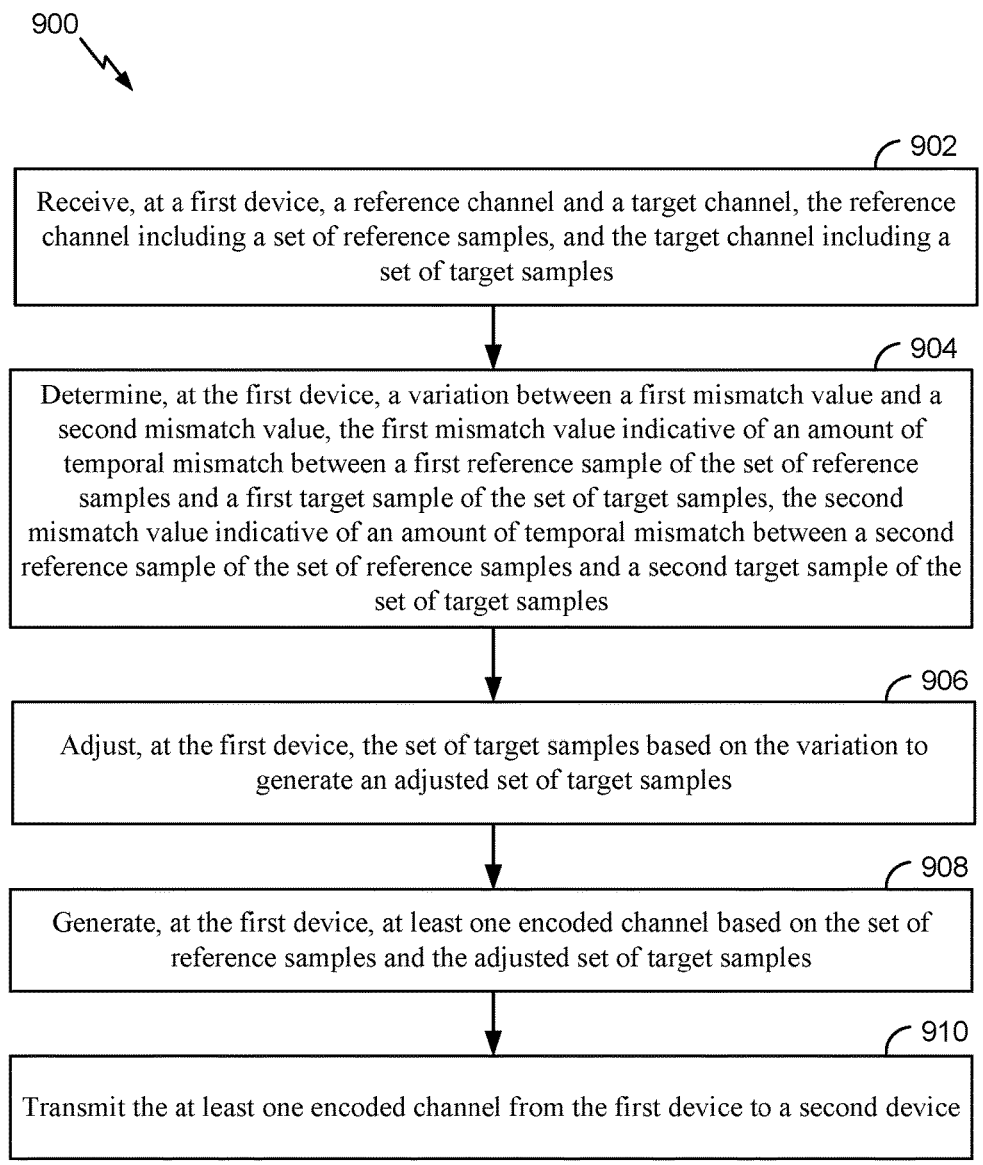
FIG. 9 is a flow chart that illustrates a particular method of encoding multiple channels using adjusted samples.

Referring to FIG. 9, a flow chart of a particular illustrative implementation of a method of encoding multiple audio channels using adjusted samples is shown and generally designated 900. The method 900 may be performed by the first device 102 of FIGS. 1, 4, 7, and 8, by the second device 160 of FIGS. 1 and 4, or by the system 500 of FIG. 5 as illustrative, non-limiting examples.

The method 900 includes receiving, at a first device, a reference channel and a target channel, at 902. The reference channel includes a set of reference samples, and the target channel includes a set of target samples. For example, referring to FIG. 1, the encoder 120 may receive the first audio signal 142 (e.g., a reference channel) from the first microphone 140 and the second audio signal 146 (e.g., a target channel) from the second microphone 144. The first audio signal 142 may include a set of reference samples (e.g., the first samples 116), and the second audio signal 146 may include a set of target samples (e.g., the second samples 118).

The method 900 includes determining, at a first device, a variation between a first mismatch value and a second mismatch value, at 904. The first mismatch value may be indicative of an amount of temporal mismatch between a first reference sample of the set of reference samples and a first target sample of the set of target samples. The second mismatch value may be indicative of an amount of temporal mismatch between a second reference sample of the set of reference samples and a second target sample of the set of target samples. For example, referring to FIG. 1, the comparator 122 may determine the difference 124 (e.g., a variation) between the first mismatch value 112 and the second mismatch value 114. The first mismatch value 112 may be indicative of an amount of temporal mismatch between a first reference sample (e.g., a first frame) of the first samples 116 and a first target sample (e.g., a corresponding frame) of the second samples 118. The second mismatch value 114 may be indicative of an amount of temporal mismatch between a second reference sample (e.g., a second frame) of the first samples 116 and a second target sample of the second samples 118. The second reference sample may be subsequent to the first reference sample, and the second target sample may be subsequent to the first target sample.

In a particular implementation, the first mismatch value 112 indicates a number of samples that a frame of the second audio signal 146 is time-shifted relative to a corresponding frame of the first audio signal 142, and the second mismatch value 114 indicates a number of samples that another frame of the second audio signal 146 is time-shifted relative to a corresponding frame of the first audio signal 142. The first mismatch value 112 may correspond to an amount of time delay between receipt of the first frame via a first microphone 140 and receipt of the second frame via a second microphone 144. For example, due to the sound source 150 being closer to the first microphone 140 than to the second microphone 144, the second audio signal 146 may be delayed relative to the first audio signal 142. In a particular implementation, the first audio signal 142 includes one of a right channel signal or a left channel signal, and the second audio signal 146 includes the other of the right channel signal or the left channel signal. In other implementations, the audio signals 142 and 146 include other signals.

According to one implementation of the method 900, the variation may be a value based at least on a reference channel indicator and a difference between the first mismatch value and the second mismatch value. The variation may also be based on a set of mismatch values over several sets of samples.

According to one implementation, the method 900 may include determining whether to adjust the set of target samples based on the variation. Additionally, the method 900 may include determining whether to adjust the set of target samples based on a reference channel indicator. The method 900 may also include determining whether to adjust the set of target samples based at least on energy of the reference channel and an energy of the target channel. The method 900 may further include determining whether to adjust the set of target samples based on a transient detector.

After determining to adjust the target samples based on one or more of the techniques described above, the method 900 includes adjusting, at the first device, the set of target samples based on the difference to generate an adjusted set of target samples, at 906. For example, referring to FIG. 1, the sample adjuster 126 may adjust the second samples 118 based on the difference 124 to generate the adjusted samples 128 (e.g., adjusted target samples).

The method 900 includes generating, at the first device, at least one encoded channel based on the set of reference samples and the adjusted set of target samples, at 908. For example, the signal generator 130 may generate the encoded channels 180 based on the first samples 116 and the adjusted samples 128. In a particular implementation, the at least one encoded channel (e.g., the encoded channels 180) includes a mid-channel, a side-channel, or both. For example, the channel generator 130 (or the midside generator 510) may perform stereo encoding to generate the mid-channel 540 and the side-channel 542.

The method 900 further includes transmitting the at least one encoded channel from the first device to a second device, at 910. For example, the first device 102 may transmit, via a network interface of the one or more interfaces 104, the encoded channels 180 to the second device 160.

In a particular implementation, a first portion of the second samples 118 may be time-shifted relative to a first portion of the first samples 116 by an amount that is based on the first mismatch value 112, and a second portion of the second samples 118 may be time-shifted relative to a second portion of the first samples 116 by an amount that is based on the second mismatch value 114. For example, with reference to FIG. 2, samples 2-641 of the second samples 118 may be time-shifted relative to samples 0-639 of the first samples 116, and samples 643-1282 of the second samples 118 may be time-shifted relative to samples 640-1279 of the first samples 116. The number of samples that are time shifted may be based on the first mismatch value 112 and the second mismatch value 114.

In another particular implementation, determining the difference 124 includes subtracting the first mismatch value 112 from the second mismatch value 114. For example, the comparator 122 may be configured to subtract the first mismatch value 112 from the second mismatch value 114 to generate the difference 124. Additionally or alternatively, the method 900 includes generating the mid-channel 540 based on a sum of the first samples 116 and the adjusted samples 128, and generating the side-channel 542 based on a difference of the first samples 116 and the adjusted samples 128. For example, the channel generator 130 may generate the mid-channel 540 based on a combination (e.g., a sum) of the first samples 116 and the adjusted samples 128, and the channel generator 130 may generate the side-channel 542 based on a difference between the first samples 116 and the adjusted samples 128. The encoded channels 180 may include the mid-channel 540 and the side-channel 542. Alternatively, the channel generator 130 may generate the mid-channel 540 and one or more side channel parameters.

In another particular implementation, the method 900 includes down-sampling the reference channel 142 to generate a first down-sampled channel, down-sampling the target channel 146 to generate a second down-sampled channel, and determining the first mismatch value 112 and the second mismatch value 114 based on comparisons of the first down-sampled channel and the second down-sampled channel. For example, the channel pre-processor 502 may down-sample the first audio signal 142 and the second audio signal 146 to generate the processed channels 530, and the shift estimator 121 may compare the processed channels 530 to determine the first mismatch value 112 and the second mismatch value 114. The shift estimator 121 may compare a sample of the first down-sampled channel to multiple samples of the second down-sampled channel to determine a particular sample of the second down-sampled channel. For example, the shift estimator 121 may generate comparison values (e.g., difference values, similarity values, coherence values, or cross-correlation values) based on comparisons of the sample of the first down-sampled channel to the samples of the second down-sampled channel, and the shift estimator 121 may identify a particular sample of the second down-sampled channel corresponding to the lowest (or highest) comparison value. A delay of the particular sample of the second down-sampled channel relative to the sample of the first down-sampled channel may correspond to the first value 112. The shift estimator 121 may similarly determine the second mismatch value 114. Additionally, the method 900 may further include selecting the first mismatch value 112 and the second mismatch value 114 such that the difference fails to exceed a threshold. For example, the shift estimator 121 may select the mismatch values 112 and 114 such that the mismatch values 112 and 114 do not exceed a threshold. The threshold may be a number of samples that is less than the number of samples that correspond to a frame.

In another particular implementation, adjusting the second samples 118 may include interpolating a portion of the second samples 118 based on the difference 124 to generate a set of estimated samples and replacing the portion of the second samples 118 with the set of estimated samples to generate the adjusted samples 128. For example, the sample adjuster 126 may interpolate a subset of the second samples 118 to generate the estimated samples 210 (or the estimated samples 310), and the sample adjuster 126 may replace the subset of the second samples 118 with the estimated samples 210 (or the estimated samples 310) to generate the adjusted samples 128. The interpolation may include a sinc interpolation. Alternatively, the interpolation may include a Lagrange interpolation. Alternatively, the interpolation may include a hybrid interpolation (e.g., a combination of sinc interpolation and Lagrange interpolation).

Additionally or alternatively, the interpolation may be performed on a number of samples corresponding to a spreading factor. For example, the number of samples in the subset of the second samples 118 may correspond to the spreading factor M, as described with reference to FIGS. 2-3. A value of the spreading factor may be less than or equal to a number of samples in a frame of the second audio signal 146. For example, the number of samples in a frame (e.g., the second frame or the fourth frame) of the second audio signal 146 may be 640, and a value of the spreading factor may be less than 640. In a particular implementation, a value of the spreading factor may be 528. In the examples illustrated in FIGS. 2-3, the value of the spreading factor is four. Additionally or alternatively, a value of the spreading factor may be based on an audio smoothness setting. Additionally or alternatively, the method 900 may include determining an audio type of the second audio signal 146 and selecting a value of the spreading factor based on the audio type. The audio type may include speech, music, or noise. For example, the sample adjuster 126 may determine an audio type of the second audio signal 146, and the sample adjuster 126 may select a spreading factor that corresponds to the determined audio type. Each audio type (e.g., speech, music, noise, etc.) may correspond to a different spreading factor. Additionally or alternatively, the estimated samples 310 may correspond to a higher sampling rate than the second samples 118. For example, the second samples 118 may be adjusted using the estimated samples 310 to prevent repetition of one or more samples, and the estimated samples 310 may correspond to a higher sampling rate than the second samples 118, as described with reference to FIG. 3. In an alternate implementation, the estimated samples 310 correspond to a lower sampling rate than the second samples 118. For example, the second samples 118 may be adjusted using the estimated samples 210 to prevent skipping of one or more samples, and the estimated samples 210 may correspond to a lower sampling rate than the second samples 118, as described with reference to FIG. 2.

In another particular implementation, the method 900 includes selecting one of the first audio signal 142 or the second audio signal 146 as a reference channel, and selecting the other of the first audio signal 142 or the second audio signal 146 as a target channel for a first time period based on the first mismatch value 112. The method 900 further includes transmitting, to the second device 160, a reference channel indicator 184 having a first value during the first time period that indicates whether the first audio signal 142 or the second audio signal 146 is selected as the reference channel. To illustrate, the reference channel designator 508 may select one of the first audio signal 142 and the second audio signal 146 as the reference channel for the first time period (corresponding to the first frame and the second frame) based on whether the first mismatch value 112 is a negative value. The reference channel designator 508 may set the value of the reference channel indicator 184 to identify the reference channel. For example, when the reference channel indicator 184 has a first value (e.g., a logical zero value), the first audio signal 142 is identified as the reference channel, and when the reference channel indicator 184 has a second value (e.g., a logical one value), the second audio signal 146 is identified as the reference channel. The first device 102 may transmit the reference channel indicator 184 (or a target channel indicator indicating the target channel) to the second device 160 via the network 152. The method 900 may further include selecting one of the first audio signal 142 or the second audio signal 146 as the reference channel for a second time period based on the second mismatch value 114, the reference channel indicator 184 having a second value during the second time period that indicates whether the first audio signal 142 or the second audio signal 146 is selected as the reference channel. For example, the reference channel designator 508 may, based on the second mismatch value 114, set the value of the reference channel indicator 184 to indicate whether the first audio signal 142 or the second audio signal 146 is the reference channel for a time period corresponding to the third frame and the fourth frame. Additionally, the second samples 118 may be adjusted when the second audio signal 146 is selected as the target channel during the second time period. For example, the sample adjuster 126 may adjust the second samples 118 when the second audio signal 146 is identified as the target channel. Alternatively, the sample adjuster 126 may adjust the first samples 116 when the first audio signal 142 is identified as the target channel.

The method 900 enables adjustment of an audio channel to compensate for (or to conceal) discontinuities at frame boundaries. Adjusting the audio channel to compensate for discontinuities at frame boundaries may reduce or eliminate clicks, pops, or other audio sounds during playback of decoded audio channels.

Figure 10:
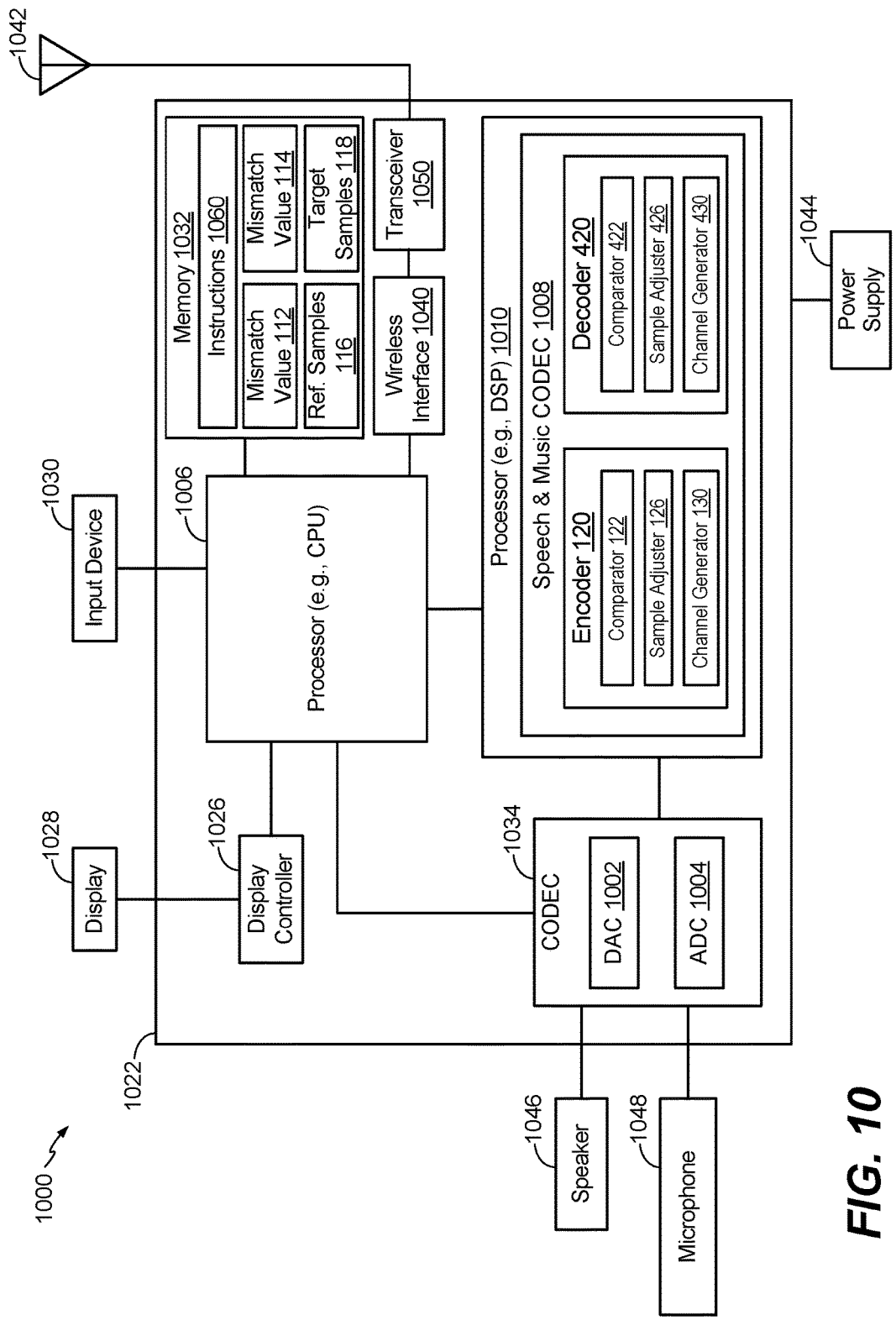
FIG. 10 is a block diagram of a wireless device that is operable to perform operations in accordance with the systems and methods of FIGS. 1-9.

Referring to FIG. 10, a block diagram of a particular illustrative implementation of a device (e.g., a wireless communication device) is depicted and generally designated 1000. In various implementations, the device 1000 may have more or fewer components than illustrated in FIG. 10. In an illustrative implementation, the device 1000 may correspond to one or more of the first device 102 of FIGS. 1, 4, 7, and 8, the second device 160 of FIGS. 1 and 4, or the system 500 of FIG. 5.

In a particular implementation, the device 1000 includes a processor 1006 (e.g., a central processing unit (CPU)). The device 1000 may include one or more additional processors 1010 (e.g., one or more digital signal processors (DSPs)). The processors 1010 may include a speech and music coder-decoder (CODEC) 1008. The speech and music CODEC 1008 may include a vocoder encoder (e.g., the encoder 120 of FIG. 1 or the encoder 120 of FIG. 4), a vocoder decoder (e.g., the decoder 162 of FIG. 1 or the decoder 420 of FIG. 4), or both. In a particular implementation, the speech and music CODEC 1008 may be an enhanced voice services (EVS) CODEC that communicates in accordance with one or more standards or protocols, such as a 3rd Generation Partnership Project (3GPP) EVS protocol. In a particular implementation, the encoder 120 includes the comparator 122, the sample adjuster 126, and the channel generator 130, and the decoder 420 includes the comparator 422, the sample adjuster 426, and the output generator 430. In an alternate implementation, the speech and music CODEC 1008 may include the decoder 162 of FIG. 1, the encoder 402 of FIG. 4, or both.

The device 1000 may include a memory 1032 and a CODEC 1034. Although not shown, the memory 1032 may include the first mismatch value 112, the second mismatch value 114, the first samples 116, the second samples 118, the difference 124, the adjusted samples 128, or a combination thereof. The device 1000 may include a wireless interface 1040 coupled, via a transceiver 1050, to an antenna 1042.

The device 1000 may include a display 1028 coupled to a display controller 1026. A speaker 1046, a microphone 1048, or a combination thereof, may be coupled to the CODEC 1034. The CODEC 1034 may include a DAC 1002 and an ADC 1004. In a particular implementation, the CODEC 1034 may receive analog signals from the microphone 1048, convert the analog signals to digital signals using the ADC 1004, and provide the digital signals to the speech and music CODEC 1008. The speech and music CODEC 1008 may process the digital signals. In a particular implementation, the speech and music CODEC 1008 may provide digital signals to the CODEC 1034. The CODEC 1034 may convert the digital signals to analog signals using the DAC 1002 and may provide the analog signals to the speaker 1046.

In a particular implementation, the device 1000 may be included in a system-in-package or system-on-chip device 1022. In a particular implementation, the memory 1032, the processor 1006, the processors 1010, the display controller 1026, the CODEC 1034, the wireless interface 1040, and the transceiver 1050 are included in a system-in-package or system-on-chip device 1022. In a particular implementation, an input device 1030 and a power supply 1044 are coupled to the system-on-chip device 1022. Moreover, in a particular implementation, as illustrated in FIG. 10, the display 1028, the input device 1030, the speaker 1046, the microphone 1048, the antenna 1042, and the power supply 1044 are external to the system-on-chip device 1022. In a particular implementation, each of the display 1028, the input device 1030, the speaker 1046, the microphone 1048, the antenna 1042, and the power supply 1044 may be coupled to a component of the system-on-chip device 1022, such as an interface or a controller.

The device 1000 may include a headset, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof.

In an illustrative implementation, the memory 1032 includes or stores instructions 1060 (e.g., executable instructions) such as computer-readable instructions or processor-readable instructions. For example, the memory 1032 may include or correspond to a non-transitory computer-readable medium storing instructions (e.g., the instructions 1060). The instructions 1060 may include one or more instructions that are executable by a computer, such as the processor 1006 or the processors 1010. The instructions 1060 may cause the processor 1006 or the processors 1010 to perform the method 900 of FIG. 9.

In a particular implementation, the encoder 120 may be configured to determine the difference 124 between the first mismatch value 112 and the second mismatch value 114. The first mismatch value 112 may be indicative of a shift of a first frame of the first audio signal 142 relative to a second frame of the second audio signal 146, and the second mismatch value 114 may be indicative of a shift of a third frame of the first audio signal 142 relative to a fourth frame of the second audio signal 146. The first audio signal 142 may be associated with the first samples 116, and the second audio signal 146 may be associated with the second samples 118. The encoder 120 may be configured to adjust the second samples 118 based on the difference 124 to generate the adjusted samples 128. The encoder 120 may be further configured to generate at least one encoded channel (e.g., the encoded channels 180 of FIG. 1) based on the first samples 116 and the adjusted samples 128. The wireless interface 1040 may be configured to transmit the at least one encoded channel (e.g., the encoded channels 180 of FIG. 1). Alternatively, the instructions 1060 stored in the memory 1032 may cause a processor (e.g., the processor 1006 or the processors 1010) to initiate the operations described above.

In conjunction with the described aspects, a first apparatus includes means for receiving a reference channel. The reference channel may include a set of reference samples. For example, the means for receiving the reference channel may include the first microphone 140 of FIG. 1, the second microphone of FIG. 1, the encoder 120 of FIGS. 1, 7, AND 8, the processor 1006, the processors 1010 of FIG. 10, one or more other structures or circuits, or any combination thereof.

The first apparatus may also include means for receiving a target channel. The target channel may include a set of target samples. For example, the means for receiving the target channel may include the first microphone 140 of FIG. 1, the second microphone of FIG. 1, the encoder 120 of FIGS. 1, 7, and 8, the processor 1006, the processors 1010 of FIG. 10, one or more other structures or circuits, or any combination thereof.

The first apparatus may also include means for determining a difference between a first mismatch value and a second mismatch value. The first mismatch value may be indicative of an amount of temporal mismatch between a first reference sample of the set of reference samples and a first target sample of the set of target samples. The second mismatch value may be indicative of an amount of temporal mismatch between a second reference sample of the set of reference samples and a second target sample of the set of target samples. For example, the means for determining may include \or correspond to the encoder 120 of FIG. 1, 7, or 8, the comparator 122 of FIG. 1, the decoder 420, the comparator 422 of FIG. 4, the inter-frame shift variation analyzer 506 of FIG. 5, the encoder 120, the comparator 122, the decoder 420, the comparator 422, the processor 1006, the processors 1010 of FIG. 10, one or more other structures or circuits configured to determine a difference between the first mismatch value and the second mismatch value, or any combination thereof.

The first apparatus may also include means for adjusting the set of target samples based on the difference to generate an adjusted set of target samples. For example, the means for adjusting may include the sample adjuster 126 of FIGS. 1, 5, and 10, the temporal equalizer 708 of FIG. 7, the temporal equalizer 808 of FIG. 8, the processor 1006, the processors 1010 of FIG. 10, one or more other structures or circuits, or any combination thereof.

The first apparatus may also include means for generating at least one encoded channel based on the set of reference samples and the adjusted set of target samples. For example, the means for generating may include the encoder 120 of FIG. 1, 7, or 8, the processor 1006, the processors 1010 of FIG. 10, one or more other structures or circuits, or any combination thereof.

The first apparatus further includes means for transmitting the at least one encoded channel to a device. The means for transmitting may include or correspond to the one or more interfaces 104, the first device 102 of FIG. 1, 7, or 8, the wireless interface 1040, the transceiver 1050 of FIG. 10, one or more other structures or circuits configured to transmit the at least one encoded signal, or any combination thereof.

One or more of the disclosed aspects may be implemented in a system or an apparatus, such as the device 1000, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 1000 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, any other device that includes a processor or that stores or retrieves data or computer instructions, or a combination thereof. As another illustrative, non-limiting example, the system or the apparatus may include remote units, such as handheld personal communication systems (PCS) units, portable data units such as global positioning system (GPS) enabled devices, meter reading equipment, or any other device that includes a processor or that stores or retrieves data or computer instructions, or any combination thereof.

Although one or more of FIGS. 1-10 may illustrate systems, apparatuses, and/or methods according to the teachings of the disclosure, the disclosure is not limited to these illustrated systems, apparatuses, and/or methods. One or more functions or components of any of FIGS. 1-10 as illustrated or described herein may be combined with one or more other portions of another of FIGS. 1-10. Accordingly, no single implementation described herein should be construed as limiting and implementations of the disclosure may be suitably combined without departing form the teachings of the disclosure. As an example, the method 900 of FIG. 9 may be performed by processors of the first device 102 of FIG. 1, 4, 7, or 8, by processors of the second device 160 of FIGS. 1 and 4, or by the processors 1006 or 1010 of FIG. 10. To illustrate, a portion of the method 900 of FIG. 9 may be combined with other operations described herein. Additionally, one or more operations described with reference to the method 900 of FIG. 9 may be optional, may be performed at least partially concurrently, and/or may be performed in a different order than shown or described.

Figure 11:
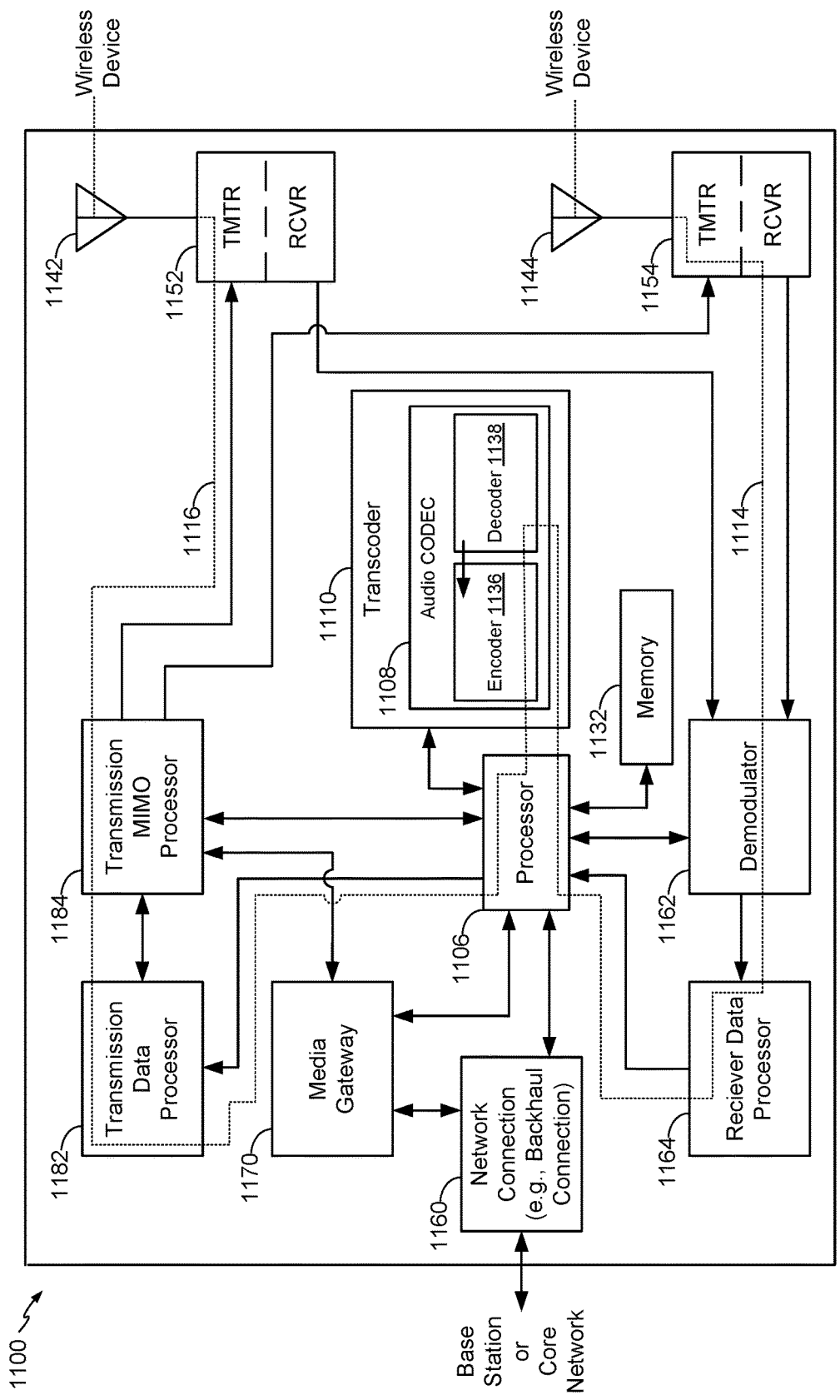
FIG. 11 is a base station that is operable to perform operations in accordance with the systems and methods of FIGS. 1-9.

Referring to FIG. 11, a block diagram of a particular illustrative example of a base station 1100 is depicted. In various implementations, the base station 1100 may have more components or fewer components than illustrated in FIG. 11. In an illustrative example, the base station 1100 may include the first device 104, the second device 106 of FIG. 1, or a combination thereof. In an illustrative example, the base station 1100 may operate according to one or more of the methods or systems described with reference to FIGS. 1-10.

The base station 1100 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 1000 of FIG. 10.

Various functions may be performed by one or more components of the base station 1100 (and/or in other components not shown), such as sending and receiving messages and data (e.g., audio data). In a particular example, the base station 1100 includes a processor 1106 (e.g., a CPU). The base station 1100 may include a transcoder 1110. The transcoder 1110 may include an audio CODEC 1108. For example, the transcoder 1110 may include one or more components (e.g., circuitry) configured to perform operations of the audio CODEC 1108. As another example, the transcoder 1110 may be configured to execute one or more computer-readable instructions to perform the operations of the audio CODEC 1108. Although the audio CODEC 1108 is illustrated as a component of the transcoder 1110, in other examples one or more components of the audio CODEC 1108 may be included in the processor 1106, another processing component, or a combination thereof. For example, a decoder 1138 (e.g., a vocoder decoder) may be included in a receiver data processor 1164. As another example, an encoder 1136 (e.g., a vocoder encoder) may be included in a transmission data processor 1182.

The transcoder 1110 may function to transcode messages and data between two or more networks. The transcoder 1110 may be configured to convert message and audio data from a first format (e.g., a digital format) to a second format. To illustrate, the decoder 1138 may decode encoded signals having a first format and the encoder 1136 may encode the decoded signals into encoded signals having a second format. Additionally or alternatively, the transcoder 1110 may be configured to perform data rate adaptation. For example, the transcoder 1110 may down-convert a data rate or up-convert the data rate without changing a format the audio data. To illustrate, the transcoder 1110 may down-convert 64 kbit/s signals into 16 kbit/s signals.

The audio CODEC 1108 may include the encoder 1136 and the decoder 1138. The encoder 1136 may include the encoder 120 of FIG. 1. The decoder 1138 may include the decoder 162 of FIG. 1.

The base station 1100 may include a memory 1132. The memory 1132, such as a computer-readable storage device, may include instructions. The instructions may include one or more instructions that are executable by the processor 1106, the transcoder 1110, or a combination thereof, to perform one or more operations described with reference to the methods and systems of FIGS. 1-10. The base station 1100 may include multiple transmitters and receivers (e.g., transceivers), such as a first transceiver 1152 and a second transceiver 1154, coupled to an array of antennas. The array of antennas may include a first antenna 1142 and a second antenna 1144. The array of antennas may be configured to wirelessly communicate with one or more wireless devices, such as the device 1000 of FIG. 10. For example, the second antenna 1144 may receive a data stream 1114 (e.g., a bit stream) from a wireless device. The data stream 1114 may include messages, data (e.g., encoded speech data), or a combination thereof.

The base station 1100 may include a network connection 1160, such as backhaul connection. The network connection 1160 may be configured to communicate with a core network or one or more base stations of the wireless communication network. For example, the base station 1100 may receive a second data stream (e.g., messages or audio data) from a core network via the network connection 1160. The base station 1100 may process the second data stream to generate messages or audio data and provide the messages or the audio data to one or more wireless device via one or more antennas of the array of antennas or to another base station via the network connection 1160. In a particular implementation, the network connection 1160 may be a wide area network (WAN) connection, as an illustrative, non-limiting example. In some implementations, the core network may include or correspond to a Public Switched Telephone Network (PSTN), a packet backbone network, or both.

The base station 1100 may include a media gateway 1170 that is coupled to the network connection 1160 and the processor 1106. The media gateway 1170 may be configured to convert between media streams of different telecommunications technologies. For example, the media gateway 1170 may convert between different transmission protocols, different coding schemes, or both. To illustrate, the media gateway 1170 may convert from PCM signals to Real-Time Transport Protocol (RTP) signals, as an illustrative, non-limiting example. The media gateway 1170 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 1170 may include a transcode and may be configured to transcode data when codecs are incompatible. For example, the media gateway 1170 may transcode between an Adaptive Multi-Rate (AMR) codec and a G.711 codec, as an illustrative, non-limiting example. The media gateway 1170 may include a router and a plurality of physical interfaces. In some implementations, the media gateway 1170 may also include a controller (not shown). In a particular implementation, the media gateway controller may be external to the media gateway 1170, external to the base station 1100, or both. The media gateway controller may control and coordinate operations of multiple media gateways. The media gateway 1170 may receive control signals from the media gateway controller and may function to bridge between different transmission technologies and may add service to end-user capabilities and connections.

The base station 1100 may include a demodulator 1162 that is coupled to the transceivers 1152, 1154, the receiver data processor 1164, and the processor 1106, and the receiver data processor 1164 may be coupled to the processor 1106. The demodulator 1162 may be configured to demodulate modulated signals received from the transceivers 1152, 1154 and to provide demodulated data to the receiver data processor 1164. The receiver data processor 1164 may be configured to extract a message or audio data from the demodulated data and send the message or the audio data to the processor 1106.

The base station 1100 may include a transmission data processor 1182 and a transmission multiple input-multiple output (MIMO) processor 1184. The transmission data processor 1182 may be coupled to the processor 1106 and the transmission MIMO processor 1184. The transmission MIMO processor 1184 may be coupled to the transceivers 1152, 1154 and the processor 1106. In some implementations, the transmission MIMO processor 1184 may be coupled to the media gateway 1170. The transmission data processor 1182 may be configured to receive the messages or the audio data from the processor 1106 and to code the messages or the audio data based on a coding scheme, such as CDMA or orthogonal frequency-division multiplexing (OFDM), as an illustrative, non-limiting examples. The transmission data processor 1182 may provide the coded data to the transmission MIMO processor 1184.

The coded data may be multiplexed with other data, such as pilot data, using CDMA or OFDM techniques to generate multiplexed data. The multiplexed data may then be modulated (i.e., symbol mapped) by the transmission data processor 1182 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 1106.

The transmission MIMO processor 1184 may be configured to receive the modulation symbols from the transmission data processor 1182 and may further process the modulation symbols and may perform beamforming on the data. For example, the transmission MIMO processor 1184 may apply beamforming weights to the modulation symbols. The beamforming weights may correspond to one or more antennas of the array of antennas from which the modulation symbols are transmitted.

During operation, the second antenna 1144 of the base station 1100 may receive a data stream 1114. The second transceiver 1154 may receive the data stream 1114 from the second antenna 1144 and may provide the data stream 1114 to the demodulator 1162. The demodulator 1162 may demodulate modulated signals of the data stream 1114 and provide demodulated data to the receiver data processor 1164. The receiver data processor 1164 may extract audio data from the demodulated data and provide the extracted audio data to the processor 1106.

The processor 1106 may provide the audio data to the transcoder 1110 for transcoding. The decoder 1138 of the transcoder 1110 may decode the audio data from a first format into decoded audio data and the encoder 1136 may encode the decoded audio data into a second format. In some implementations, the encoder 1136 may encode the audio data using a higher data rate (e.g., up-convert) or a lower data rate (e.g., down-convert) than received from the wireless device. In other implementations the audio data may not be transcoded. Although transcoding (e.g., decoding and encoding) is illustrated as being performed by a transcoder 1110, the transcoding operations (e.g., decoding and encoding) may be performed by multiple components of the base station 1100. For example, decoding may be performed by the receiver data processor 1164 and encoding may be performed by the transmission data processor 1182. In other implementations, the processor 1106 may provide the audio data to the media gateway 1170 for conversion to another transmission protocol, coding scheme, or both. The media gateway 1170 may provide the converted data to another base station or core network via the network connection 1160.

The encoder 1136 may receive a reference channel and a target channel. The encoder 1136 may also determine a difference between a first mismatch value and a second mismatch value. The encoder 1136 may also adjust a set of target samples based on the different to generate an adjusted set of target samples. The encoder 1136 may also generate at least one encoded channel based on a set of reference samples and the adjusted set of target samples. The encoder 1136 may also transmit the at least one encoded channel. The decoder 118 may generate the first output signal 126 and the second output signal 128 by decoding encoded signals based on the reference channel indicator 164, the non-causal mismatch value 162, the gain parameter 160, or a combination thereof. Encoded audio data generated at the encoder 1136, such as transcoded data, may be provided to the transmission data processor 1182 or the network connection 1160 via the processor 1106.

The transcoded audio data from the transcoder 1110 may be provided to the transmission data processor 1182 for coding according to a modulation scheme, such as OFDM, to generate the modulation symbols. The transmission data processor 1182 may provide the modulation symbols to the transmission MIMO processor 1184 for further processing and beamforming. The transmission MIMO processor 1184 may apply beamforming weights and may provide the modulation symbols to one or more antennas of the array of antennas, such as the first antenna 1142 via the first transceiver 1152. Thus, the base station 1100 may provide a transcoded data stream 1116, that corresponds to the data stream 1114 received from the wireless device, to another wireless device. The transcoded data stream 1116 may have a different encoding format, data rate, or both, than the data stream 1114. In other implementations, the transcoded data stream 1116 may be provided to the network connection 1160 for transmission to another base station or a core network.

The base station 1100 may therefore include a computer-readable storage device (e.g., the memory 1132) storing instructions that, when executed by a processor (e.g., the processor 1106 or the transcoder 1110), cause the processor to perform operations including receiving a reference channel and a target channel. The operations also include determining a difference between a first mismatch value and a second mismatch value. The operations also include adjusting a set of target samples based on the different to generate an adjusted set of target samples. The operations also include generating at least one encoded channel based on a set of reference samples and the adjusted set of target samples. The operations also include transmitting the at least one encoded channel.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device comprising
    an encoder configured to:
        receive a reference channel and a target channel, the reference channel including a set of reference samples, and the target channel including a set of target samples;
        determine a variation between a first mismatch value and a second mismatch value, the first mismatch value indicative of an amount of temporal mismatch between a first reference sample of the set of reference samples and a first target sample of the set of target samples, the second mismatch value indicative of an amount of temporal mismatch between a second reference sample of the set of reference samples and a second target sample of the set of target samples;
        interpolate a subset of the set of target samples using an interpolation factor that is based on the variation and a spreading factor to generate a set of estimated samples, the spreading factor corresponding to a value determined based on at least one characteristic of one or more audio channels;
        replace the subset of the set of target samples with the set of estimated samples to generate an adjusted set of target samples, the adjusted set of target samples configured to reduce an amount of discontinuity near boundaries of target frames associated with the target channel; and
        generate at least one encoded channel based on the set of reference samples and the adjusted set of target samples; and
    a network interface configured to transmit the at least one encoded channel.

2. The device of claim 1, wherein the encoder comprises:
    a comparator configured to determine the variation, wherein the variation is a value based at least on a reference channel indicator and a difference between the first mismatch value and the second mismatch value.

3. The device of claim 1, wherein the encoder comprises:
    a comparator configured to determine the variation, wherein the variation is based on a set of mismatch values over several sets of samples.

4. The device of claim 1, wherein the encoder comprises:
    a sample adjuster configured to determine whether to adjust the set of target samples based on the variation.

5. The device of claim 1, wherein the encoder comprises:
    a sample adjuster configured to determine whether to adjust the set of target samples based on a reference channel indicator.

6. The device of claim 1, wherein the encoder comprises:
    a sample adjuster configured to determine whether to adjust the set of target samples based at least on energy of the reference channel and an energy of the target channel.

7. The device of claim 1, wherein the encoder comprises:
    a sample adjuster configured to determine whether to adjust the set of target samples based on a transient detector.

8. The device of claim 1, wherein the encoder further comprises a channel generator configured to generate the at least one encoded channel.

9. The device of claim 8, wherein the at least one encoded channel includes a mid-channel, a side-channel, or both.

10. The device of claim 9, wherein the channel generator is configured to generate the-mid channel based on a sum of the set of reference samples and the adjusted set of target samples, and wherein the channel generator is further configured to generate the side-channel based on a difference between the set of reference samples and the adjusted set of target samples.

11. The device of claim 1, wherein the encoder comprises a shift estimator configured to determine the first mismatch value and the second mismatch value, wherein the first mismatch value and the second mismatch value are determined based on comparisons of a reference down-sampled channel to a target down-sampled channel, wherein the reference down-sampled channel is based on the reference channel, and wherein the target down-sampled channel is based on the target channel.

12. The device of claim 11, wherein the shift estimator is configured to compare a sample of the reference down-sampled channel to multiple samples of the target down-sampled channel to determine a particular sample of the target down-sampled channel, and wherein the first mismatch value is associated with the particular sample.

13. The device of claim 1, further comprising:
    a first input interface configured to receive a first audio signal from a first microphone; and
    a second input interface configured to receive a second audio signal from a second microphone, wherein the first audio signal corresponds to one of the reference channel or the target channel, and wherein the second audio signal corresponds to the other of the reference channel or the target channel.

14. The device of claim 1, wherein the encoder and the network interface are integrated into a mobile device.

15. The device of claim 1, wherein the encoder and the network interface are integrated into a base station.

16. A method of wireless communication, the method comprising
    receiving, at a first device, a reference channel and a target channel, the reference channel including a set of reference samples, and the target channel including a set of target samples;
    determining, at the first device, a variation between a first mismatch value and a second mismatch value, the first mismatch value indicative of an amount of temporal mismatch between a first reference sample of the set of reference samples and a first target sample of the set of target samples, the second mismatch value indicative of an amount of temporal mismatch between a second reference sample of the set of reference samples and a second target sample of the set of target samples;

interpolating, at the first device, a subset of the set of target samples using an interpolation factor that is based on the variation and a spreading factor to generate a set of estimated samples, the spreading factor corresponding to a value determined based on at least one characteristic of one or more audio channels;

replacing the subset of the set of target samples with the set of estimated samples to generate an adjusted set of target samples, the adjusted set of target samples configured to reduce an amount of discontinuity near boundaries of target frames associated with the target channel;

generating, at the first device, at least one encoded channel based on the set of reference samples and the adjusted set of target samples; and transmitting the at least one encoded channel from the first device to a second device.

17. The method of claim 16, wherein the variation is a value based at least on a reference channel indicator and a difference between the first mismatch value and the second mismatch value.

18. The method of claim 16, wherein the variation is based on a set of mismatch values over several sets of samples.

19. The method of claim 16, further comprising determining whether to adjust the set of target samples based on the variation.

20. The method of claim 16, further comprising determining whether to adjust the set of target samples based on a reference channel indicator.

21. The method of claim 16, further comprising determining whether to adjust the set of target samples based at least on energy of the reference channel and an energy of the target channel.

22. The method of claim 16, further comprising determining whether to adjust the set of target samples based on a transient detector.

23. The method of claim 16, wherein a first subset of the set of target samples are time-shifted relative to a first subset of the set of reference samples by an amount that is based on the first mismatch value, and wherein a second subset of the set of target samples are time-shifted relative to a second subset of the set of reference samples by an amount that is based on the second mismatch value.

24. The method of claim 16 further comprising:
down-sampling the reference channel to generate a reference down-sampled channel;
down-sampling the target channel to generate a target down-sampled channel; and
determining the first mismatch value and the second mismatch value based on comparisons of the reference down-sampled channel and the target down-sampled channel.

25. The method of claim 24, further comprising selecting the first mismatch value and the second mismatch value such that the variation fails to exceed a threshold.

26. The method of claim 16, wherein interpolating the subset of the set of target samples comprises performing a sinc interpolation.

27. The method of claim 16, wherein interpolating the subset of the set of target samples comprises performing a Lagrange interpolation.

28. The method of claim 16, wherein the interpolation is performed using window fading.

29. The method of claim 16, wherein interpolating the subset of the set of target samples comprises performing a hybrid interpolation.

30. The method of claim 16, wherein the interpolation is performed on a number of samples corresponding to the spreading factor.

31. The method of claim 30, wherein a value of the spreading factor is less than or equal to a number of samples in a frame of the target channel.

32. The method of claim 30, wherein a value of the spreading factor is based on an audio smoothness setting.

33. The method of claim 30, further comprising:
determining an audio type of the target channel; and
selecting a value of the spreading factor based on the audio type.

34. The method of claim 33, wherein the audio type comprises speech, music, or noise.

35. The method of claim 16, wherein the set of estimated samples correspond to a higher sampling rate than the set of target samples.

36. The method of claim 16, wherein the set of estimated samples correspond to a lower sampling rate than the set of target samples.

37. The method of claim 16, wherein the first mismatch value corresponds to an amount of time delay between receipt of a frame of a first audio signal via a first microphone and receipt of a corresponding frame of a second audio signal via a second microphone, wherein the first audio signal corresponds to one of the reference channel or the target channel, and wherein the second audio signal corresponds to the other of the reference channel or the target channel.

38. The method of claim 16, wherein the at least one encoded channel includes a mid channel, a side channel, or both.

39. The method of claim 16, wherein a first audio signal includes one of a right channel or a left channel, and wherein a second audio signal includes the other of the right channel or the left channel, wherein the first audio signal corresponds to one of the reference channel or the target channel, and wherein the second audio signal corresponds to the other of the reference channel or the target channel.

40. The method of claim 16, wherein the first device is integrated into a mobile device.

41. The method of claim 16, wherein the first device is integrated into a base station.

42. An apparatus comprising:
means for receiving a reference channel, the reference channel including a set of reference samples;
means for receiving a target channel, the target channel including a set of target samples;
means for determining a variation between a first mismatch value and a second mismatch value, the first mismatch value indicative of an amount of temporal mismatch between a first reference sample of the set of reference samples and a first target sample of the set of target samples, the second mismatch value indicative of an amount of temporal mismatch between a second reference sample of the set of reference samples and a second target sample of the set of target samples;
means for interpolating a subset of the set of target samples using an interpolation factor that is based on the variation and a spreading factor to generate a set of estimated samples, the spreading factor corresponding to a value determined based on at least one characteristic of one or more audio channels;

means for replacing the subset of the set of target samples with the set of estimated samples to generate an adjusted set of target samples, the adjusted set of target samples configured to reduce an amount of discontinuity near boundaries of target frames associated with the target channel;

means for generating at least one encoded channel based on the set of reference samples and the adjusted set of target samples; and means for transmitting the at least one encoded channel.

43. The apparatus of claim 42, wherein the variation is a value based at least on a reference channel indicator and a difference between the first mismatch value and the second mismatch value.

44. The apparatus of claim 42, wherein the variation is based on a set of mismatch values over several sets of samples.

45. The apparatus of claim 42, further comprising means for determining whether to adjust the set of target samples based on the variation.

46. The apparatus of claim 42, further comprising means for determining whether to adjust the set of target samples based on a reference channel indicator.

47. The apparatus of claim 42, further comprising means for determining whether to adjust the set of target samples based at least on energy of the reference channel and an energy of the target channel.

48. The apparatus of claim 42, further comprising means for determining whether to adjust the set of target samples based on a transient detector.

49. The apparatus of claim 42, wherein a first audio signal includes one of a right channel or a left channel, and wherein a second audio signal includes the other of the right channel or the left channel, wherein the first audio signal corresponds to one of the reference channel or the target channel, and wherein the second audio signal corresponds to the other of the reference channel or the target channel.

50. The apparatus of claim 42, wherein the means for determining, the means for interpolating, the means for generating, and the means for transmitting are integrated into a mobile device.

51. The apparatus of claim 42, wherein the means for determining, the means for interpolating, the means for generating, and the means for transmitting are integrated into a base station.

52. A non-transitory computer-readable medium storing instructions that, when executed by a processor, cause the processor to perform operations comprising:

receiving, at a first device, a reference channel and a target channel, the reference channel including a set of reference samples, and the target channel including a set of target samples;

determining, at the first device, a variation between a first mismatch value and a second mismatch value, the first mismatch value indicative of an amount of temporal mismatch between a first reference sample of the set of reference samples and a first target sample of the set of target samples, the second mismatch value indicative of an amount of temporal mismatch between a second reference sample of the set of reference samples and a second target sample of the set of target samples;

interpolating a subset of the set of target samples using an interpolation factor that is based on the variation and a spreading factor to generate a set of estimated samples, the spreading factor corresponding to a value determined based on at least one characteristic of one or more audio channels;

replacing the subset of the set of target samples with the set of estimated samples to generate an adjusted set of target samples, the adjusted set of target samples configured to reduce an amount of discontinuity near boundaries of target frames associated with the target channel;

generating, at the first device, at least one encoded channel based on the set of reference samples and the adjusted set of target samples; and transmitting the at least one encoded channel from the first device to a second device.

53. The non-transitory computer-readable medium of claim 52, wherein the variation is a value based at least on a reference channel indicator and a difference between the first mismatch value and the second mismatch value.

54. The non-transitory computer-readable medium of claim 52, wherein the variation is based on a set of mismatch values over several sets of samples.

55. The non-transitory computer-readable medium of claim 52, wherein the operations further comprise determining whether to adjust the set of target samples based on the variation.

56. The non-transitory computer-readable medium of claim 52, wherein the operations further comprise determining whether to adjust the set of target samples based on a reference channel indicator.

57. The non-transitory computer-readable medium of claim 52, wherein the operations further comprise determining whether to adjust the set of target samples based at least on energy of the reference channel and an energy of the target channel.

58. The non-transitory computer-readable medium of claim 52, wherein the operations further comprise determining whether to adjust the set of target samples based on a transient detector.

59. A device comprising a network interface configured to receive at least one encoded channel from a second device;

a decoder configured to:

decode the at least one encoded channel to generate a decoded reference channel and a decoded target channel, the decoded reference channel including a set of decoded reference samples, and the decoded target channel including a set of decoded target samples;

determine a variation between a first mismatch value and a second mismatch value, the first mismatch value indicative of an amount of temporal mismatch between a first decoded reference sample of the set of decoded reference samples and a first decoded target sample of the set of decoded target samples, the second mismatch value indicative of an amount of temporal mismatch between a second decoded reference sample of the set of decoded reference samples and a second decoded target sample of the set of decoded target samples;

interpolate a subset of the set of decoded target samples using an interpolation factor that is based on the variation and a spreading factor to generate a set of estimated samples, the spreading factor corresponding to a value determined based on at least one characteristic of one or more audio channels; and replace the subset of the set of decoded target samples with the set of estimated samples to generate to generate an adjusted set of decoded target samples, the adjusted set of decoded target samples configured to reduce an amount of discontinuity near boundaries of decoded target frames associated with the decoded target channel; and one or more speakers configured to output an audio signal based at least in part on the adjusted set of decoded target samples.

60. The device of claim 59, wherein the decoder comprises:
   a comparator configured to determine the variation; and
   a sample adjuster configured to adjust the set of decoded target samples.

61. The device of claim 60, wherein the comparator is configured to subtract the first mismatch value from the second mismatch value to determine the variation.

* * * * *